United States Patent
Sasahara

(10) Patent No.: US 6,810,352 B2
(45) Date of Patent: Oct. 26, 2004

(54) SYSTEM, METHOD, AND COMPUTER PROGRAM PRODUCT FOR AIDING OPTIMIZATION OF DIE ASSEMBLY SHAPE FOR PLASTICITY MANUFACTURING

(75) Inventor: Takatoshi Sasahara, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 10/222,862

(22) Filed: Aug. 19, 2002

(65) Prior Publication Data

US 2003/0050765 A1 Mar. 13, 2003

(30) Foreign Application Priority Data

Sep. 10, 2001 (JP) ........................................ 2001-273422
Jul. 31, 2002 (JP) ........................................ 2002-222678

(51) Int. Cl.$^7$ ............................. G01B 7/00; G06F 15/00
(52) U.S. Cl. ..................... 702/155; 702/170; 72/14.8; 72/21.1
(58) Field of Search .............................. 702/115, 155, 702/167, 170; 72/14.8, 16.1, 19.9, 21.1, 21.5, 38, 60, 364, 446

(56) References Cited

U.S. PATENT DOCUMENTS

| | | | | |
|---|---|---|---|---|
| 5,913,929 A | * | 6/1999 | Gustafsson et al. | ........... 72/31.1 |
| 6,003,358 A | * | 12/1999 | Lipari et al. | ................... 72/404 |
| 6,140,716 A | * | 10/2000 | Norton | ........................ 307/125 |

FOREIGN PATENT DOCUMENTS

| | | |
|---|---|---|
| JP | 8-287294 | 11/1996 |
| JP | 10-170253 | 6/1998 |
| JP | 2000-172731 | 6/2000 |

OTHER PUBLICATIONS

English Language Abstract of JP 8–287294.
English Language Abstract of JP 10–170253.
English Language Abstract of JP 2000–172731.

* cited by examiner

*Primary Examiner*—Bryan Bui
(74) *Attorney, Agent, or Firm*—Greenblum & Bernstein, P.L.C.

(57) ABSTRACT

In order to realize improving dimensional accuracy of a plastic workpiece and realize reducing a production cost and shortening time duration of manufacture, a computer comprises an initial die assembly shape calculating function to calculate a die assembly shape for the plastic workpiece according to a predetermined designed shape of said plastic workpiece; a workpiece shape calculating function to calculate the shape of the plastic workpiece to be manufactured with the initial die assembly shape considering a manufacturing condition of the plastic workpiece; a shape comparing function to compare the calculated shape of the plastic workpiece and the designed shape of the plastic workpiece; a workpiece-redesigning function to calculate a new designed shape of the plastic workpiece according to a result of the comparison; and a die assembly reshaping function to calculate a new die assembly shape according to the new designed shape of the plastic workpiece.

17 Claims, 15 Drawing Sheets

$\theta a < \theta s$ $\theta b \geq \theta s$

FIG.12  PRIOR ART
| | Failure (defect) | Frames and members | Panels (inner and outer panels) |
|---|---|---|---|
| I | Change of angle (springback, spring-go) | 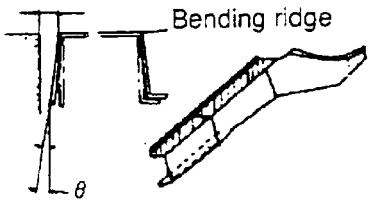 Bending ridge | 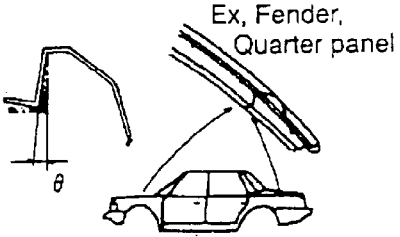 Ex, Fender, Quarter panel |
| II | Wall warping | 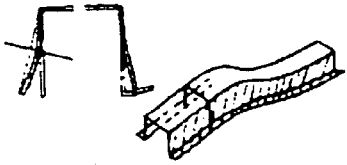 | 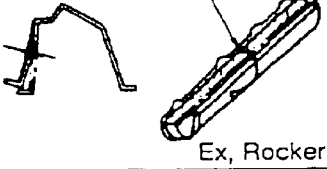 Ex, Rocker panel |
| III | Twisting | 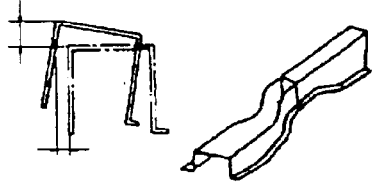 | 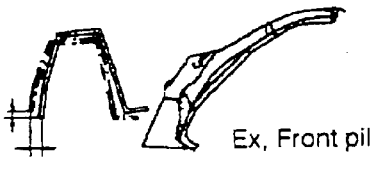 Ex, Front pillars |
| IV | Ridge bending (face bending,) | 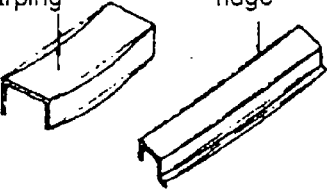 Warping  ridge | 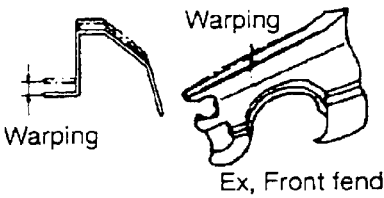 Warping / Warping / Ex, Front fender |
| V | Defect of loose coupling of shape (punch bottom) | | 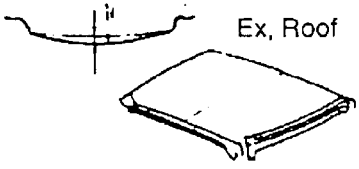 Ex, Roof |

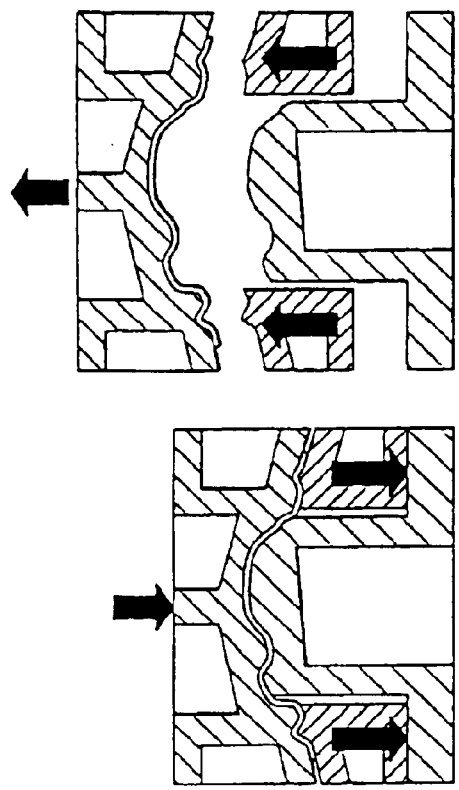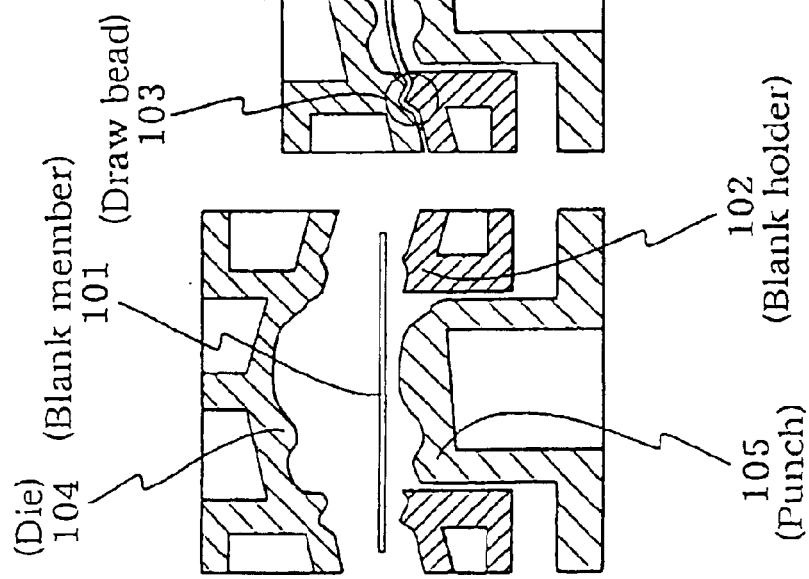

SYSTEM, METHOD, AND COMPUTER PROGRAM PRODUCT FOR AIDING OPTIMIZATION OF DIE ASSEMBLY SHAPE FOR PLASTICITY MANUFACTURING

BACKGROUND OF THE INVENTION

1. Field of the Invention

The present invention relates to a system for aiding optimization of a die assembly shape for plasticity manufacturing, particularly, relates to the system for aiding optimization of the die assembly shape to calculate a die assembly shape for manufacturing a plastic workpiece. Moreover, the present invention relates to a method for aiding optimization of the die assembly shape, a computer program product for aiding optimization of the die assembly shape, and a storage medium storing the computer program product.

2. Brief Description of Related Art

Conventionally, in automobile-related manufacturing industries, for example, developing a body with a light weight and high rigidity is desired. For this purpose, it is necessary to widely use a high tensile strength steel sheet. Moreover, applying an aluminium sheet is increasingly needed. However, the following problem arises: a fault in dimensional accuracy, exemplified by a springback occurring after press working a plastic workpiece. Here, the springback is defined as that a press worked metal member recovers an original shape. Therefore, for example, the shape of the workpiece which press worked in accordance with the designed shape deforms after removed from a die assembly (die and punch). FIG. 12 shows an example of the fault in dimensional accuracy caused by springback in various automobile components.

Here, a specific example of an occurrence of springback will be described with reference to FIG. 13. FIG. 13A to FIG. 13D are figures showing processes of press working for the plastic workpiece. First, a blank member 101 is installed in the die assembly (FIG. 13A.). Next, the blank member 101 is held by the die assembly with a draw bead 103 formed in the blank holder 102 (FIG. 13B.) Then, draw shaping of the blank member 101 is performed by press working which uses a die assembly 104 and a punch 105 (FIG. 13C.) Following this step, the plastic workpiece is finished by removal from the die assembly (FIG. 13D). Where, the workpiece has not been plastically shaped corresponding to the die assembly completely, but is deformed in different shape from the die assembly shape cause of the springback., i.e., the workpiece is deformed to different shape from designed shape, thus the fault of dimensional accuracy is occurred.

Therefore, conventionally, occurrence of the fault of dimensional accuracy caused by the above described springback was generally subjected to a measure by an experience and guesswork of an expert technician. The example thereof will be described with reference to FIG. 14 and FIG. 15. FIG. 14 is a flow chart showing the steps for optimization of the die assembly shape conventionally. FIG. 15 is a sectional diagrammatic figure showing the plastic workpiece.

First, according to the designed shape of the plastic workpiece ($B_0$ of FIG. 15), namely, the designed shape supplied to step of manufacturing the product, the die assembly shape is designed (step S101.) Then, the shape of the plastic workpiece manufactured by using this die assembly is calculated by simulation (step S102.) In this step, various manufacturing conditions such as characteristics of a material of the workpiece and a press working condition are considered. Particularly, a springback characteristic of the workpiece is considered. Thus, the shape calculated becomes, as shown in FIG. 15, the shape subjected to springback from a reference point P of the workpiece to a position indicated by an arrow C (after-springback shape ($B_1$ of FIG. 15). Evaluation of dimensional accuracy calculated for the plastic workpiece is carried out by comparing with the shape of a product by a human (step S103 and step S104.) As a result, if NG decision is made, on the basis of the shape of the product and the result of simulation, the human analyzes fault of dimensional accuracy to express as an angle difference in a predetermined part of and the position difference in coordinate values on a 2-dimensional plane to calculate the new designed shape of the plastic workpiece (step S106.) In other words, the new designed shape is calculated considering deformation by the springback after the workpiece is removed from the die assembly (springback-considered shape ($B_{exp\_1}$ of FIG. 15). The die assembly shape is corrected according to such new designed shape of the workpiece (step S107), and new die assembly shape is calculated. On the other hand, if the shape of calculated workpiece satisfies a requirement of dimensional accuracy in the step S104, an actual die assembly is manufactured according to the shape of the workpiece (step S105.)

However, the above described approach requires a human decision for the dimensional accuracy for every calculation of the shape of the plastic workpiece. In addition, for a correction of die assembly shape, it is required a much cost of die assembly correction including labor cost and cost for repeating the simulation (about 8% of the cost of die assembly manufacture) and many steps for it. As the result, the following problems arise: rise of a cost of the product and bad influence such as an increase in a period for development on a time schedule of production preparation. Consequently, a manufacturing method capable of deciding an optimal die assembly shape considering the fault of dimensional accuracy is desired in a stage where no real die assembly can be used.

On the contrary, fault of dimensional accuracy in a certain degree is expected to be forecasted by simulation using finite element method (FEM). It is in progress that the fault of dimensional accuracy in a level of 2-dimensional plane of the component is considered for design of the die assembly. A technology and system for deciding mechanically the die assembly shape properly considering a fault of 3-dimensional accuracy on the basis of the result of simulation has not been realized.

As the system for deciding a certain variables on the basis of the result of press working simulation, Japanese Published Unexamined Patent Application No. 10-170253, Japanese Published Unexamined Patent Application No. 8-287294, Japanese Published Unexamined Patent Application No. 2000-172731, have been published. All these applications are not technology and system for deciding mechanically the die assembly shape properly considering the fault of 3-dimensional accuracy.

SUMMARY OF THE INVENTION

The present invention has an objective of solving a defect of the above described conventional example and particularly improving dimensional accuracy of the plastic workpiece and providing the system, method and computer program product, for aiding optimization of the die assembly shape in plasticity manufacturing, capable of reducing a product cost and shortening manufacturing time duration.

Therefore, the present invention is constituted as that the computer comprises: an initial die assembly shape calculating function to calculate a die assembly shape for the plastic workpiece according to a predetermined designed shape of said plastic workpiece; a workpiece shape calculating function to calculate the shape of the plastic workpiece to be manufactured with the initial die assembly shape considering a manufacturing condition of the plastic workpiece; a shape comparing function to compare the calculated shape of the plastic workpiece and the designed shape of the plastic workpiece; a workpiece-redesigning function to calculate a new designed shape of the plastic workpiece according to a result of the comparison; and a die assembly reshaping function to calculate a new die assembly shape according to the new designed shape of the plastic workpiece.

And, it is preferable that the shape comparing function calculates a predetermined comparison value by comparing the predetermined designed shape of said plastic workpiece with the shape calculated by said workpiece shape calculating function, and said workpiece redesigning function and said die assembly reshaping function work each in the case where said calculated comparison value does not fall in a predetermined tolerance range in order to calculate the new die assembly shape. In this occasion, the workpiece shape calculating function is preferably calculates the shape of the plastic workpiece considering the springback characteristic of the predetermined material used for the plastic workpiece.

According to such configuration, first, an operator inputs data of the designed shape of the plastic workpiece to the computer and the die assembly shape used for the plastic workpiece is calculated by the computer on the basis of the designed shape data. Next, the shape of the plastic workpiece manufactured with this die assembly shape by press working is simulated by the computer. In this step, the shape of the plastic workpiece calculated considers the springback characteristic of the material. Then, the calculated shape of the plastic workpiece is compared with the designed shape of the plastic workpiece for calculating the comparison value. In such case, the comparison value has a value according to the springback characteristic of the plastic workpiece.

In the case where the comparison value is kept within a predetermined tolerance, in the other word, the calculated shape of the plastic workpiece is in a range of an error allowable against the designed shape, the simulation is finished in the status and the first calculated die assembly shape is decided to be the die assembly for actually manufacturing. On the other hand, in the case where the comparison value is larger than the tolerance, the computer calculates the new designed shape of the plastic workpiece on the basis of comparison value. The die assembly shape allowing manufacture of this new designed shape is calculated by the computer.

Therefore, the new designed shape of the plastic workpiece, of which fault of dimensional accuracy caused by influence of the springback characteristic of the plastic workpiece is automatically corrected, is calculated. The new die assembly shape is calculated according to this step and therefore, the dimensional accuracy can be improved and a time consumed for optimization of the die assembly by simulation can be shortened, resulting in shortening a time for product development and reducing a cost of the product.

It is preferable that the workpiece shape calculating function also works on the new die assembly shaped by the die assembly reshapeing function. Accordingly, the new die assembly shape is calculated for correction of fault of dimensional accuracy of the plastic workpiece of which shape is once calculated by simulation. The shape of the plastic workpiece manufacturable by using this new die assembly shape is calculated by simulation. The calculated shape of the plastic workpiece is compared with the predetermined designed shape, the new designed shape of the plastic workpiece, of which fault of dimensional accuracy has been corrected, is again calculated, and the new die assembly shape based on the new designed shape of the plastic workpiece is calculated. Thus, by repeating correction of fault of dimensional accuracy, it is possible to calculate the die assembly shape automatically for manufacturing the plastic workpiece of higher dimensional accuracy by simulation only.

In addition, it is preferable that the shape comparing function calculates an amount of springback, which is a difference between the shape of the plastic workpiece calculated considering the springback characteristic and the predetermined designed shape of the plastic workpiece for each predetermined position of the plastic workpiece, and the workpiece-redesigning function calculates the new designed shape of the plastic workpiece by subtracting the springback amount from the designed shape of the plastic workpiece in an opposite direction of a springback direction of the plastic workpiece in each position of the plastic workpiece. In these step, the shape comparing function compares an angle of the plastic workpiece in a predetermined position and compares 3-dimensional positions of predetermined nodes set on the plastic workpiece.

By this, correction of the die assembly shape is performed considering a deformation amount of the plastic workpiece caused by the springback. Hence, simulation can optimize the die assembly shape quickly manufacturable of the plastic workpiece of the higher dimensional accuracy. In other words, realizing improvement of dimensional accuracy of the workpiece, a frequency of repeated calculating of the new die assembly shape can be restricted to realize shortening of die assembly producing period.

Also, the system for aiding optimization of a die assembly shape for plasticity manufacturing, wherein the computer comprises a producibility judging function to judge the presence of deficiency upon producing the plastic workpiece based on the new designed shape of the plastic workpiece calculated by the workpiece-redesigning function. Moreover, the system for aiding optimization of a die assembly shape for plasticity manufacturing, wherein the producibility judging function comprises a draft calculating function to calculate a draft of the new designed shape of the plastic workpiece calculated by the workpiece-redesigning function, and a draft comparing function to judge the producibility of the plastic workpiece by comparing the value of the calculated draft and the value of the predetermined allowable draft.

According to this approach, first, drafts at various parts of the new designed shape are calculated considering the deformation amount of the plastic workpiece caused by springback. Then, the drafts are compared to the predetermined draft value in the allowable range to judge whether or not the plastic workpiece is actually producible (producibility). Therefore, deficiency caused by correcting the designed shape can be found at the simulation stage, thus being able to deal with the problem at an early stage. As a result, further cost for correcting the die assembly can be reduced and time required for designing the die assembly can be shortened. Whether or not the plastic workpiece can be produced into the new designed shape is not necessarily judged based on the values of the drafts.

Also, the system for aiding optimization of a die assembly shape for plasticity manufacturing, wherein the computer comprises a producibility notifying function to notify the operator of the computer of the judgment result from the producibility judging function. Specifically, the system for aiding optimization of a die assembly shape for plasticity manufacturing, wherein the computer comprises a draft propriety notifying function which operates when the draft calculated by the draft comparing function is smaller than the allowable draft and notify the operator of that position.

According to this approach, any deficiency such as the plastic workpiece being unproducible is immediately notified to the operator. Therefore, the operator can take a suitable measure, for example, manually terminating the die assembly correction process, or changing the designed shape of the notified position.

Furthermore, the system for aiding optimization of a die assembly shape for plasticity manufacturing, wherein the computer comprises an optimization process terminating function to terminate execution of the process for optimizing the die assembly shape when the producibility judging function judges that the plastic workpiece is unproducible. According to this approach, the process for correcting the die assembly based on the designed shape that is potentially unproducible is automatically terminated. Accordingly, useless processes can be minimized, time for designing the die assembly can be shortened, and the cost can be reduced.

The present invention provides a method for aiding optimization of a die assembly shape to manufacture a predetermined plastic workpiece by using a computer, wherein, the method comprising the steps of: calculating an initial die assembly shape for the plastic workpiece according to a predetermined designed shape of said plastic workpiece; calculating a shape of the plastic workpiece to be manufactured with the initial die assembly shape considering a manufacturing condition of the plastic workpiece; comparing the calculated shape of the plastic workpiece with the designed shape of the plastic workpiece; calculating a new redesigned shape of the plastic workpiece on the basis of a result of the comparison; and calculating a new die assembly shape according to the redesigned shape of the plastic workpiece. Here, it is preferably, the method for aiding optimization of a die assembly shape for plasticity manufacturing according to claim 13, wherein the method further comprises, between the step of redesigning the plastic workpiece and the step of reshaping the die assembly, a step of judging the presence of deficiency upon producing the plastic workpiece based on the new designed shape of the plastic workpiece calculated in the step of redesigning the plastic workpiece.

Moreover, the present invention also provides a computer program product stored in storage medium for aiding optimization of the die assembly shape to manufacture the predetermined plastic workpiece by controlling an operation of the computer, wherein the program product performing the processes of: calculating an initial die assembly shape for the plastic workpiece according to a predetermined designed shape of said plastic workpiece; calculating a shape of the plastic workpiece to be manufactured with the initial die assembly shape considering a manufacturing condition of the plastic workpiece; comparing the calculated shape of the plastic workpiece with the designed shape of the plastic workpiece; calculating a new redesigned shape of the plastic workpiece on the basis of a result of the comparison; and calculating a new die assembly shape according to the redesigned shape of the plastic workpiece. Also, present invention provide a storage medium storing the computer program product. Above mentioned computer program product for aiding optimization of the die assembly shape for plasticity manufacturing according to claim 15, wherein the program product controls the computer to execute a process of judging the presence of deficiency upon producing the plastic workpiece based on the new designed shape of the plastic workpiece calculated in the step of redesigning the plastic workpiece.

These steps also provide influences and effects similar to those as describe above.

BRIEF DESCRIPTION OF THE DRAWINGS

FIG. 7 shows an example of the plastic workpiece to be manufactured.

FIG. 12 shows an example of fault of dimensional accuracy caused by springback;

FIG. 13 shows a processes of press working, here, FIG. 13A shows a step before pressing, FIG. 13B shows a step of holding the a blank member in a die assembly, FIG. 13C shows a step of pressing, and FIG. 13D shows a step of removing the workpiece fro the die assembly;

DETAILED DESCRIPTION OF PREFERRED EMBODIMENT

<First Embodiment>

Figure 1:
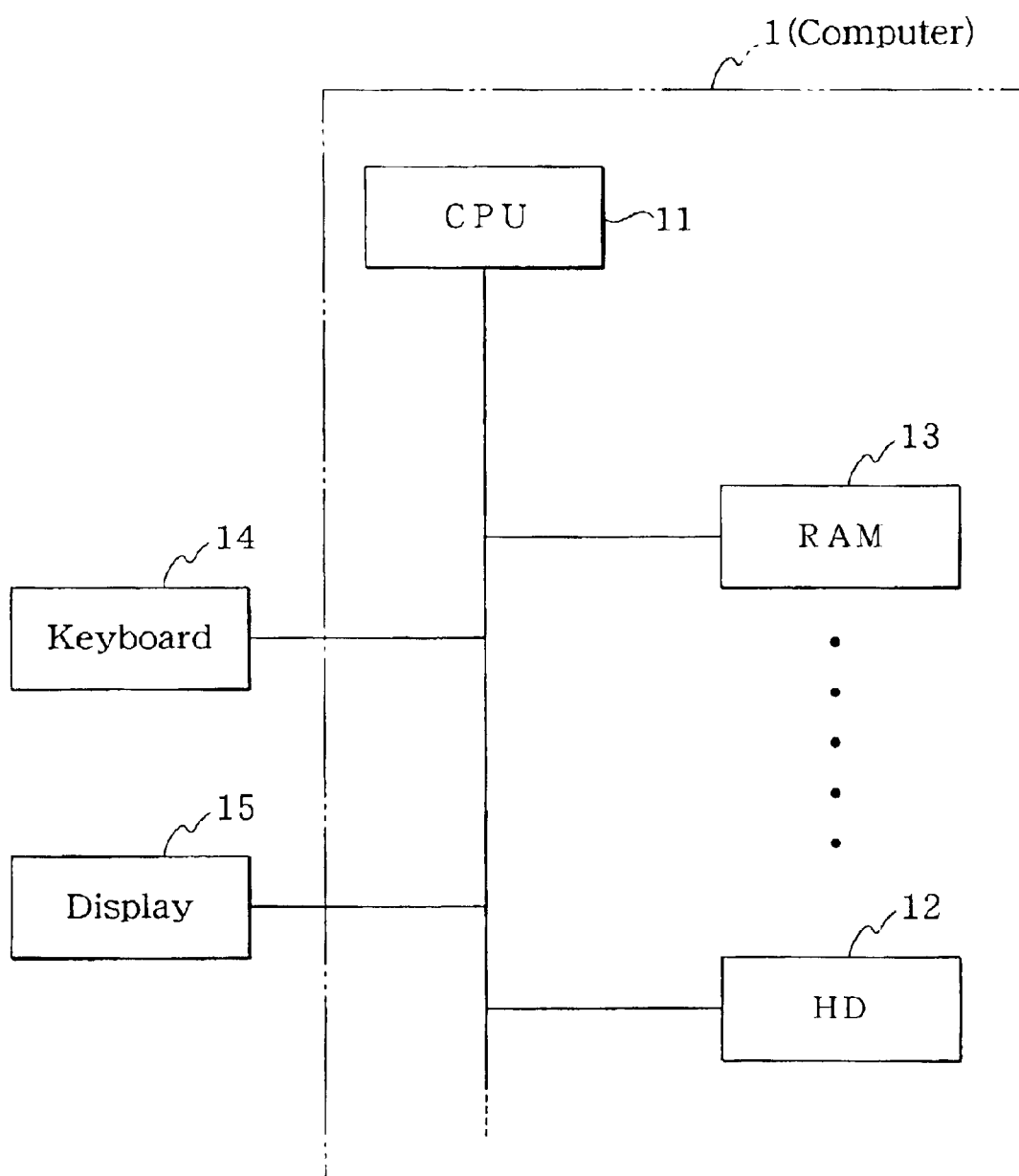
FIG. 1 is a block diagram showing a configuration of an embodiment of the present invention.
Figure 2:
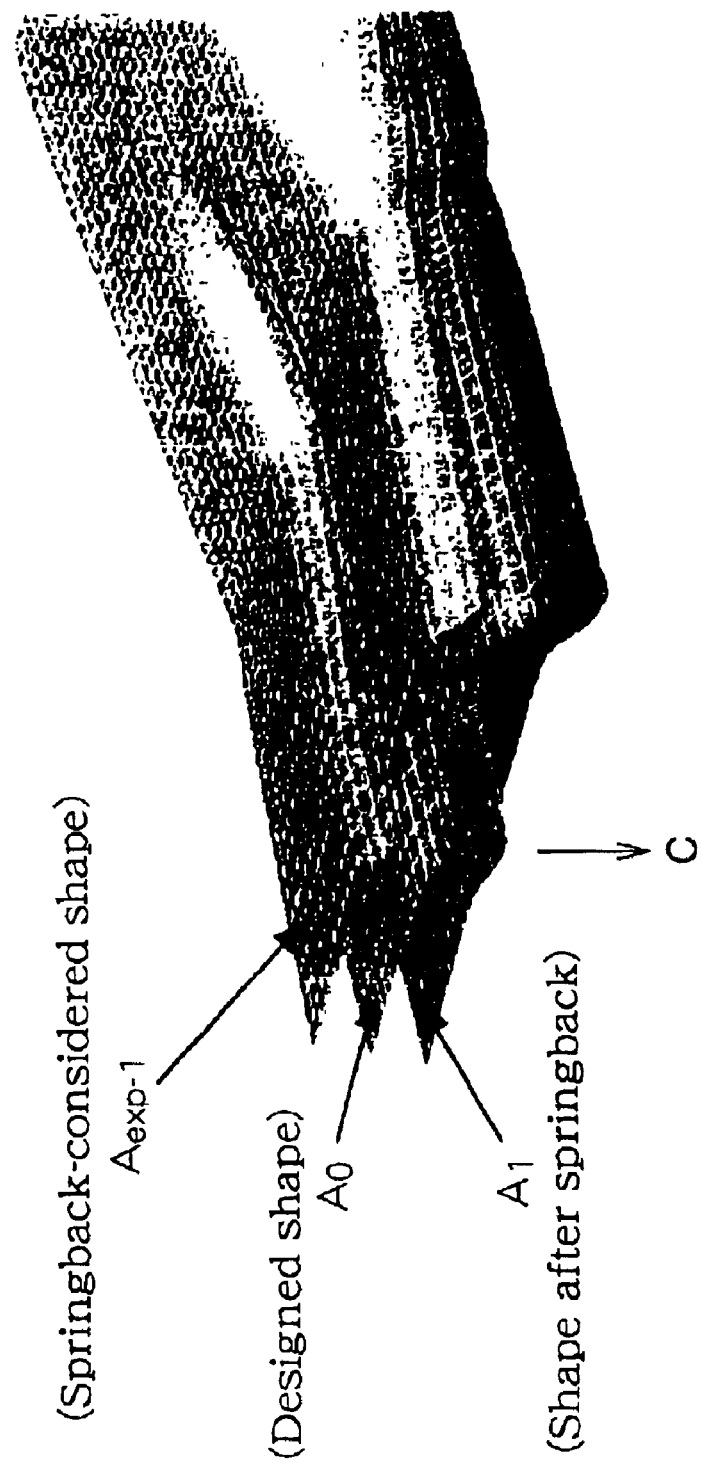
FIG. 2 is a perspective view showing a part of a shape of a plastic workpiece.
Figure 3:
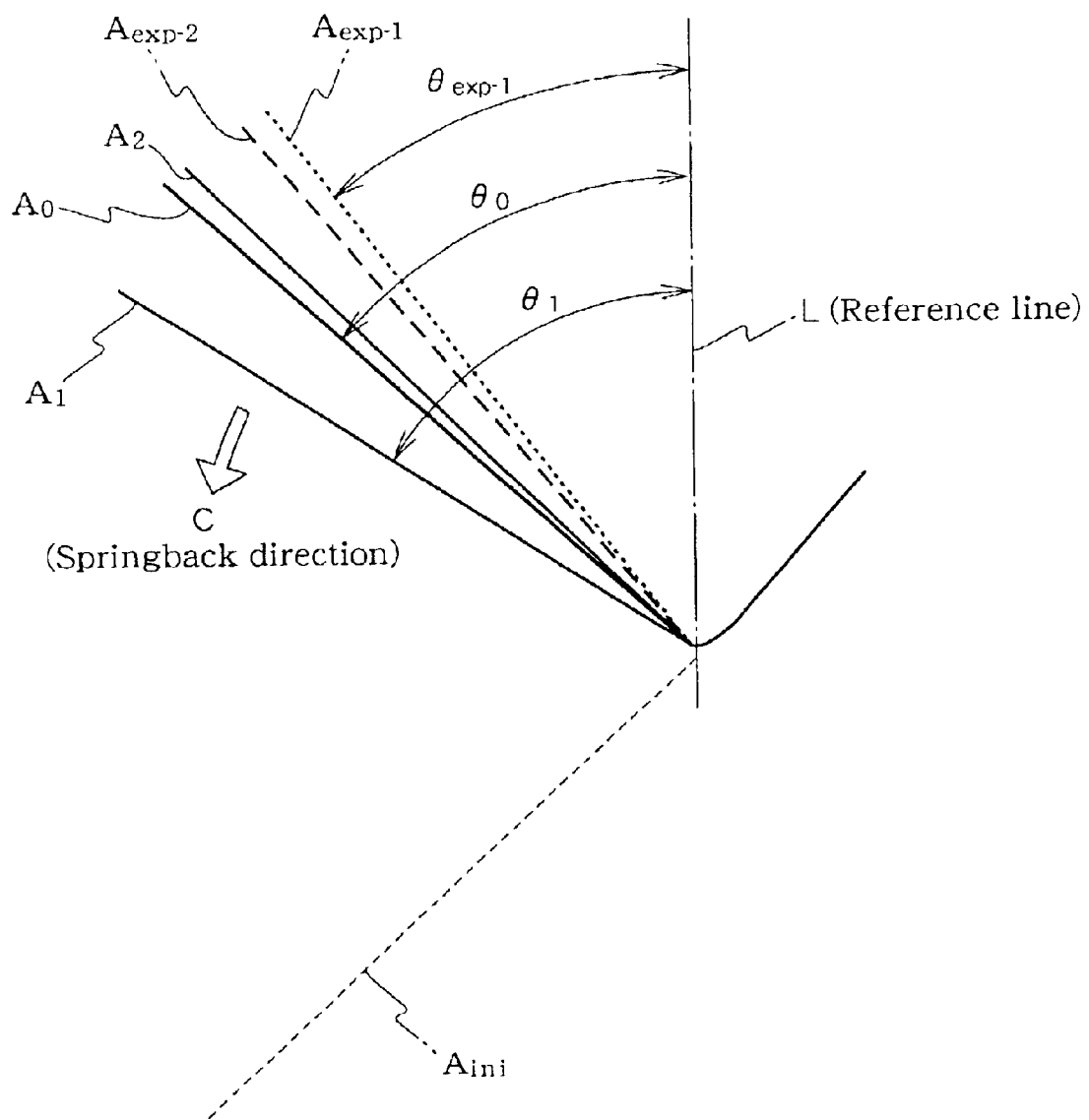
FIG. 3 is a schematic view showing the example of die assembly designing on the basis of an angle of a portion of the plastic workpiece as a parameter.
Figure 4:
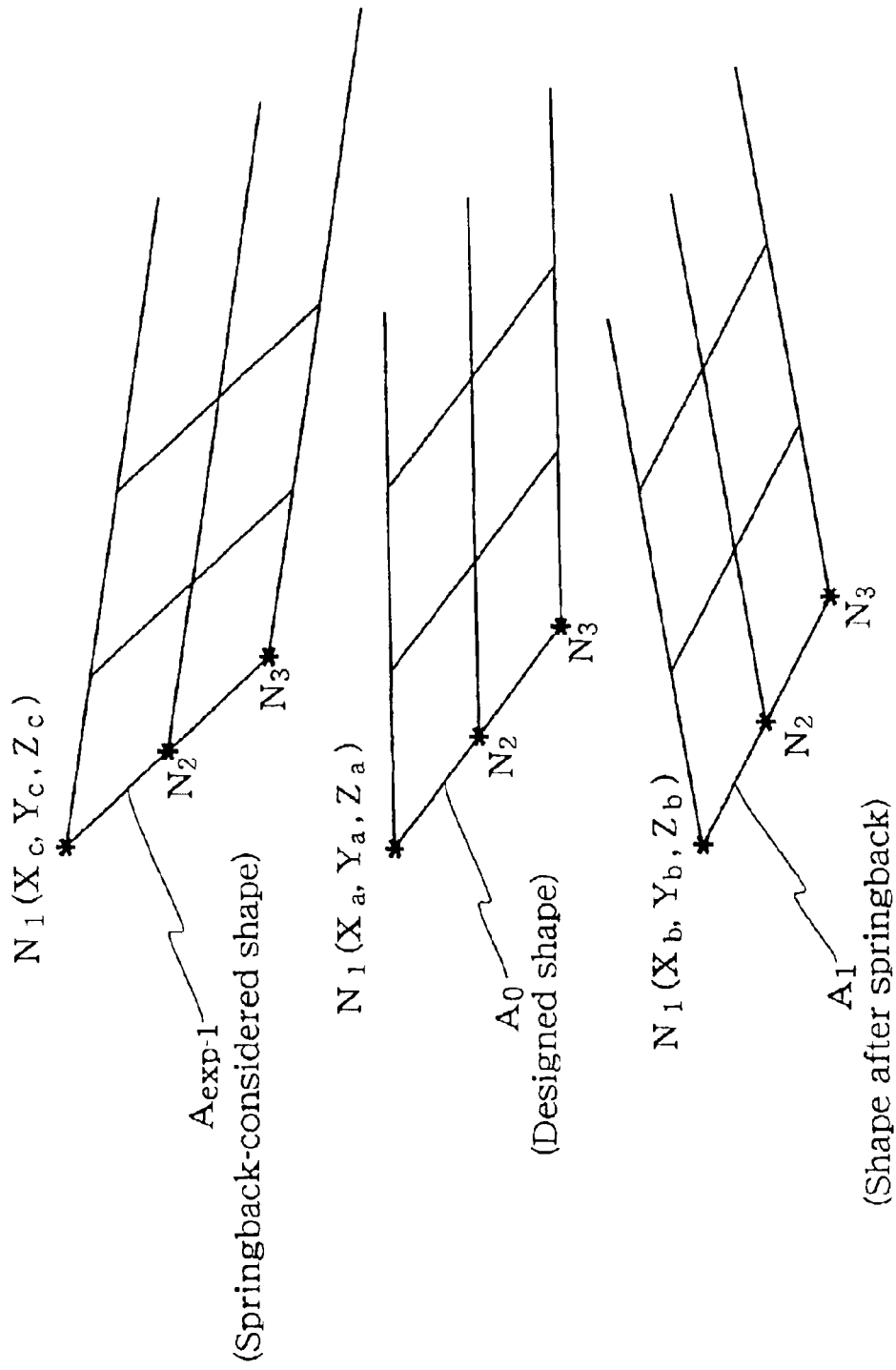
FIG. 4 is a schematic view showing the example of die assembly designing on the basis of coordinates of a node in a predetermined position of the plastic workpiece as a parameter.
Figure 5:
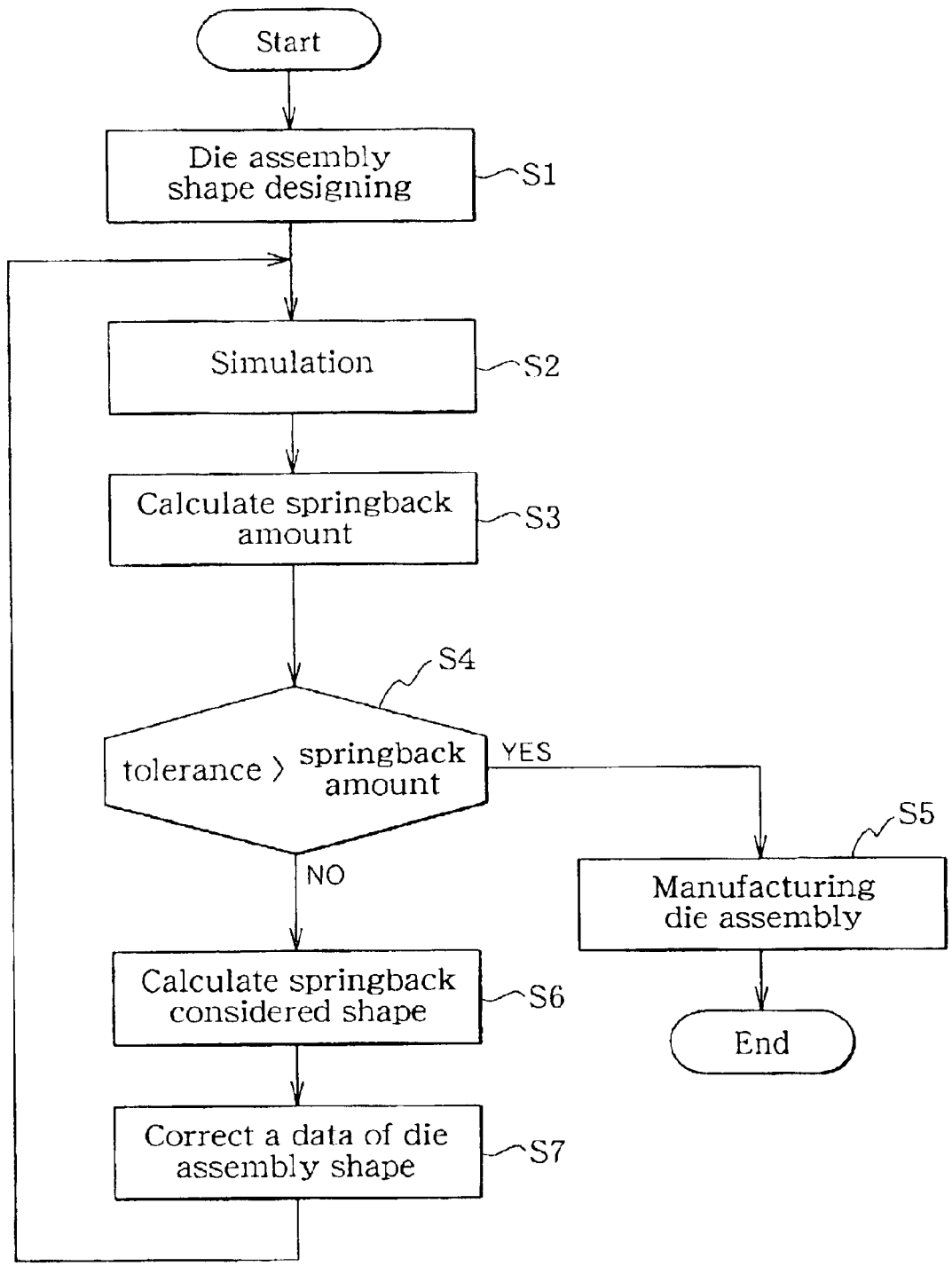
FIG. 5 is a flow chart showing a total operation of a first embodiment of the present invention.
Figure 6:
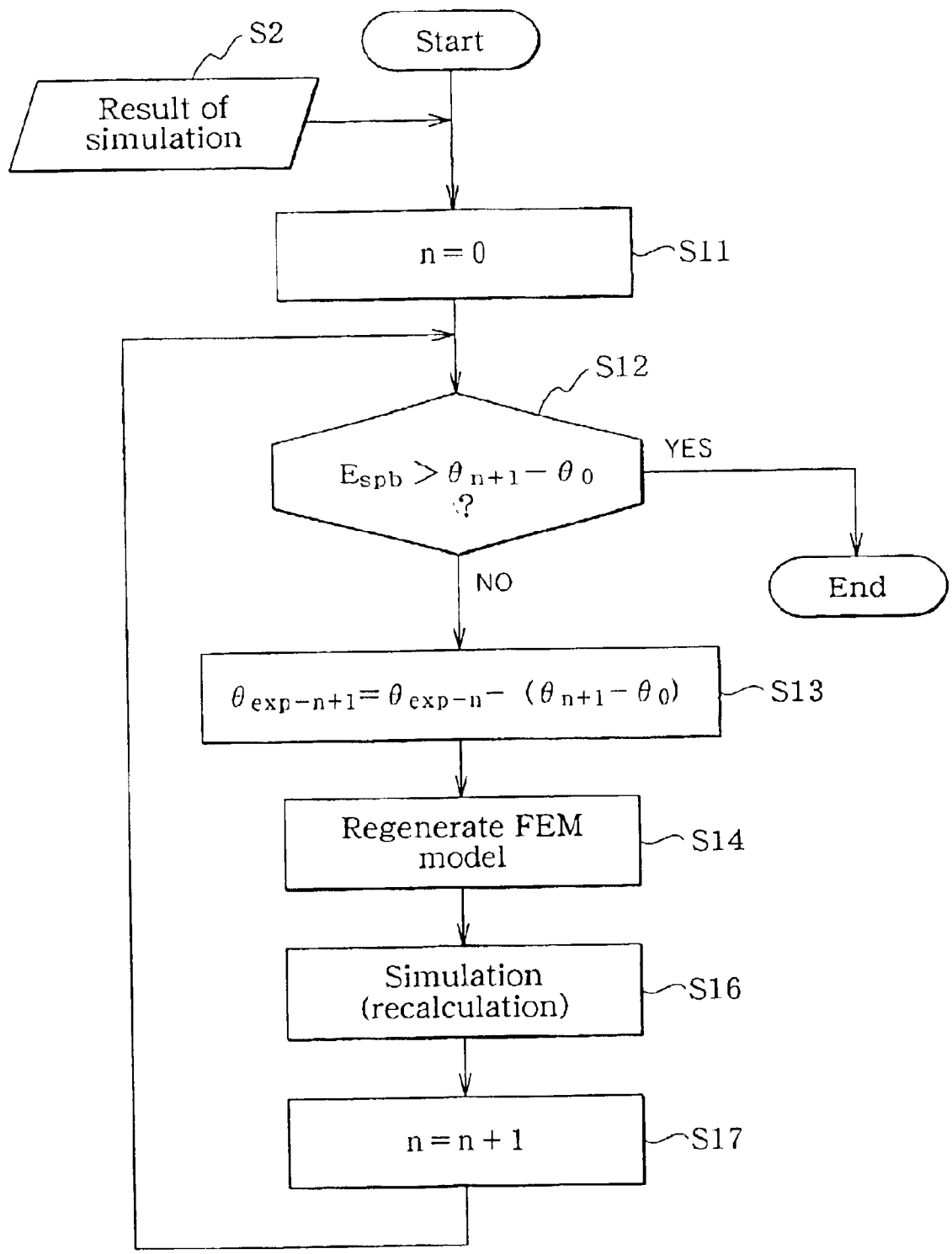
FIG. 6 is a flow chart showing an operation of an approach for redesigning the plastic workpiece in the first embodiment of the present invention.

A first embodiment of the present invention will be described below with reference to FIG. 1 to FIG. 6. FIG. 1 is a block diagram showing a constitution of a system for aiding optimization of a die assembly shape being the first embodiment of the present invention. FIG. 2 is a perspective view showing a shape of a part of a plastic workpiece. FIG. 3 is a schematic view showing the example of die assembly design using an angle in a part of the plastic workpiece as a parameter. FIG. 4 is a schematic view showing the example of die assembly design using a coordinate value of a node in a predetermined position of the plastic workpiece as the parameter. FIG. 5 and FIG. 6 are flow charts showing operations in the present embodiment.

<Configuration>

The system, shown in the FIG. 1, for aiding optimization of the die assembly shape in plasticity manufacturing uses a computer 1, which comprises a central processing unit (CPU) 11 having a predetermined processing function and a storage unit (hard disk (HD)) 12 having a predetermined capacity, to calculate a die assembly shape for manufacture of a predetermined plastic workpiece by simulation and aids an optimization of the die assembly shape in this step. In other words, incorporating a function for simulation, mentioned later, to the CPU 11 of the computer 1 works the computer 1 as the system for aiding optimization of the die assembly shape.

Specifically, this system can calculate the die assembly shape used for manufacturing the plastic workpiece, for example, a press worked component, forged component, and rolled component of various apparatuses and instruments, with plastic deformation. Particularly, this system calculates the die assembly shape, when the die assembly is used for press working to manufacture the plastic workpiece; the dimension of the plastic workpiece keeps in a range of a dimensional tolerance in comparison with a designed shape. Here, the present system is particularly effective for plastic workpiece material having a large springback degree such as a high tensile strength steel sheet or an aluminium sheet. However, the material of the workpiece is not restricted to those as described above.

This is described below in detail. The computer 1 is a work station or a server computer, performing a relatively higher processing speed. The computer 1 has equipped with the above described CPU 11 and the hard disk 12 or a RAM 13 temporarily storing a predetermined data for a manufacturing object, a keyboard (input device) 14 for inputting the predetermined data by an operator, a display (output device) 15 for displaying a processed result, which are equipped to a general computer. Therefore, not illustrated, but a ROM for storing a computer program product used frequently in the computer 1 and a drive (e.g. CD-ROM drive) for reading the predetermined data from other storage device (e.g., the CD-ROM) are equipped. This computer 1 may be, as described later, connected to other computer preparing an FEM model.

In the storage unit 12 of the above described computer 1, some data mainly used for calculating the die assembly shape and some data regarding the plastic workpiece to be manufactured by using such die assembly are stored. Particularly, the data regarding the plastic workpiece contains a data of the material of the plastic workpiece, and specifically that is a data about the springback characteristic of the material. Where, the springback characteristic is defined as the plasticity manufactured metal member returns to an original shape. For example, even if some portion of blank sheet member is bent in a predetermined angle by press working, the angle of the portion returns to an angle smaller than the angle after the blank sheet member removed from the die assembly. Particularly, the high tensile strength steel sheet and the aluminium sheet having a large springback degree (a deformation amount caused by the springback characteristic). However, the workpiece used for an automobile body requires a light weight and high rigidity and thus, such materials are frequently used.

The CPU 11 of the above described computer 1 comprises: an initial die assembly shape calculating function to calculate a die assembly shape for the plastic workpiece according to a predetermined designed shape of said plastic workpiece; a workpiece shape calculating function to calculate the shape of the plastic workpiece to be manufactured with the initial die assembly shape considering a manufacturing condition of the plastic workpiece; a shape comparing function to compare the calculated shape of the plastic workpiece and the designed shape of the plastic workpiece; a workpiece-redesigning function to calculate a new designed shape of the plastic workpiece according to a result of the comparison; and a die assembly reshaping function to calculate a new die assembly shape according to the new designed shape of the plastic workpiece.

The initial die assembly shape calculating function calculates the die assembly shape used for press working or forging working so that the plastic workpiece become the designed shape, in other words, the shape of the plastic workpiece to be supplied as the product. Hence, the die assembly shape is calculated without considering a deformation of the material after manufacturing caused by springback of the plastic workpiece mentioned later, resulting in almost same die assembly shape as the designed shape of the plastic workpiece.

The workpiece shape calculating function calculates the shape, i.e., the shape of the workpiece after remove from the die assembly by simulating the shape of the plastic workpiece manufactured by press working (e.g., FEM model.) In this step, some materials, which has been removed, has the springback characteristic as described above. Thus, such data regarding springback characteristic is read from the storage unit 12 to refer it and the shape with fault of dimensional accuracy being deformation caused by springback is calculated. However, fault of the dimensional accuracy of the plastic workpiece is not only caused by the springback characteristic. This simulation may be processed by other computer connected the computer 1 through a network. Therefore, simulation may be executed by an exclusive computer to generate an FEM model to send its result to the computer 1 as the die assembly shape simulation system.

The shape comparing function compares the designed shape of the workpiece with the calculated shape of the workpiece. Here, the designed shape is a shape of product for a market and the calculated shape is the shape of the plastic workpiece calculated by the workpiece shape calculating function. In this comparison, a difference (comparison value) in corresponding positions of individual shapes is calculated. In other words, for example, in the case where the plastic workpiece shown in FIG. 2 is press worked, the difference (comparison value, i.e., springback amount) between shapes in each end (left side of FIG. 2) of the workpiece of the designed shape $A_0$ and the shape $A_1$ after springback (shape calculated by simulation) is calculated. An object for comparison may be the angle of a predetermined position of the plastic workpiece or may be 3-dimensional position of the predetermined node set on the plastic workpiece. However, the object for comparison is not restricted to these examples. Specific examples will be mentioned later.

The workpiece redesigning function calculates a new designed shape of the plastic workpiece considering the above described comparison value so that the shape of the plastic workpiece closes to the shape of a commercial product for the market. The new designed shape calculated by the workpiece redesigning function does not match to the shape of the commercial product, because the new designed shape is calculated considering the deformation by springback after remove from the die assembly as described above. For example, the plastic workpiece shown in FIG. 2 is redesigned in the shape like $A_{exp\_1}$ considering springback. Because, even if the workpiece is designed as shape $A_0$, an actuary manufactured workpiece after removing from the die assembly springbackes toward a direction of arrow C of FIG. 2. Thus the shape of the plastic workpiece becomes as $A_1$ of FIG. 2. For this reason, the new designed shape is calculated so that the plastic workpiece is bent more than the designed shape in a direction opposite to a springback direction. Furthermore, in other words, the workpiece-redesigning function calculates the new designed shape of the plastic workpiece by subtracting the springback amount in the direction opposite to the springback direction of the plastic workpiece to design a springback-considered shape. By this, in the case where the workpiece is press worked in the shape of $A_{exp\_1}$, the workpiece is subjected to springback in the direction of the arrow C to make the shape into $A_0$. Specific redesigning approach will be described later.

The above described workpiece-redesigning function works when the above described calculated comparison value (springback amount) is not in the range of predetermined tolerance. According to this, the die assembly reshaping function mentioned later also works to calculate the new die assembly shape. Thus, if the springback amount is in the range of a tolerance, operation is finished without considering the springback amount and such die assembly is actually manufactured based on the initial die assembly shape. If the springback amount is not in the range of the tolerance, the FEM model with considering the springback amount is generated again to execute simulation (recalculation.) The above described tolerance is a predetermined value which previously stored in the hard disk 12 of the computer 1 and determined by a computer operator or a designer corresponding to the dimensional tolerance of the plastic workpiece.

The die assembly reshapeing function recalculates the die assembly for manufacture of the plastic workpiece with the shape calculated with considering deformation caused by springback as described above. As described above, since this die assembly has the shape considering the springback of the plastiv workpiece, the shape of the plastic workpiece as commercial product differs from such the die assembly shape. By simulating to calculate the die assembly shape in such manner, the die assembly shape can be designed so that the plastic workpiece has a shape within the dimensional tolerance and an appropriate die assembly shape can be determined without manufacturing the real die assembly. Therefore, the manufacturing cost of the plastic workpiece can be reduced.

Correcting a data of the die assembly shape as described above allows reducing the springback amount largely. However, correction based on one time springback estimation causes a difficulty in suppressing the dimensional accuracy within the tolerance. Therefore, the workpiece shape calculating function as described above works also on the new die assembly shape calculated by the die assembly reshapeing function. Namely, the workpiece shape calculating function calculates the shape of the plastic workpiece, which is manufactured using the new die assembly shape, by simulation. According to this step, comparison value such as springback is calculated for such the shape. If such the comparison value does not fall in the range of tolerance, the new designed shape of the plastic workpiece is recalculated and new die assembly shape is recalculated. Thus, the springback estimation is optimized by repetitive routine operation and makes possible the shape of the workpiece after springback fall in the tolerance of the dimensional accuracy quickly and assuredly.

A specific approach for redesigning the shape of the plastic workpiece by the shape comparing function and the workpiece redesigning function as described above will be described with reference to FIG. 3 and FIG. 4. First, referring to FIG. 3, the case, where the die assembly shape is designed using the angel of predetermined part of the plastic workpiece as a parameter, when the part of the plastic workpiece is bent in a V shape by bending processing, will be described.

The dotted line indicated with $A_{ini}$ in FIG. 3 is the shape (platy) of the material before plasticity manufacturing using the die assembly. And $A_0(=A_{exp\_0})$ shows a shape of the material which is bent in a V shape and designed shape as commercial product. When the die assembly with an initial angle $\theta_0$ is manufactured according to the V-shape-bending angle from a predetermined reference line L as an initial angle $\theta_0$, the shape of the plastic workpiece manufactured by such die assembly becomes $A_1$ and the angle from the reference line L of the plastic workpiece becomes $\theta_1$ by springback in the direction of the arrow C. This angle is defined as first springback angle ($\theta_1$) then the calculated shape of the plastic workpiece is compared with the designed shape, that is, calculating the difference in the angle (springback amount). Thus, springback amount can be expressed by ($\theta_1-\theta_0$.)

Subsequently, a springback-considered shape $A_{exp\_1}$ is designed considering this springback amount. In other words, the plastic workpiece is redesigned so that the shape of the workpiece close to the shape of commercial product. The V-shape bending angle (springback-considered angle) of the shape to be redesigned is the angle made by subtracting the springback amount ($\theta_1-\theta_0$) from the initial angle $\theta_0$ of the designed shape in the direction opposite to the springback direction. Therefore, the springback-considered angle $\theta_{exp\_1}$ is expressed as $\theta_0-(\theta_1-\theta_0)$. As described above, the die assembly shape for manufacturing the plastic workpiece with the bending angle of $\theta_{exp\_1}$ is recalculated.

The shape $A_2$ of the plastic workpiece manufactured by using the recalculated die assembly shape is again calculated by simulation. In this step, a second springback angle $\theta_2$ is calculated, but $\theta_2$ is not equal to $\theta_0$. The reason is that $\theta_0$ differs from the first springback-considered angle $\theta_1$ and the degree of work hardening of the plastic workpiece is different from each other. Since the springback amount is generally smaller while the degree of work hardening is larger, $\theta_2$ becomes smaller than $\theta_0$. Through these steps, in order to correct an influence of work hardening, springback estimation is optimized by a repeated routine operations. In other words, the springback amount is further calculated in order to calculate the springback-considered shape $A_{exp\_2}$.

The above described calculation will be expressed by a general formula. First, the initial angle being the bending angle of the designed shape of the plastic workpiece is expressed as $\theta_0=\theta_{exp\_0}$. Then, the angle of the shape after springback is expressed as $\theta_1$ in this state and then, the angle of the springback considered shape when redesign is carried out on the basis of the springback amount is expressed as $\theta_{exp\_1}$. Thus, if the angle in calculating the shape of the workpiece after n-th springback is expressed as $\theta_n$ and, then the following equation hold $$\theta_{exp\_n+1}=\theta_{exp\_n}-(\theta_{n+1}-\theta_0) \text{ (where, } n=0, 1, \ldots) \tag{1}$$

while the angle of the springback considerd shape when redesign is carried out on the basis of the springback amount is defined as $\theta_{exp\_n}$. If the angle $\theta_{n+1}$ of the plastic workpiece manufactured with the corrected die assembly by $\theta_{exp\_n}$ falls in the range of the predetermined tolerance (for example, neary equal to the initial value), the die assembly shape (angle is $\theta_{exp\_n}$) is decided and the simulation is finished. However, comparison with the tolerance is not restricted to the angle $\theta_{n+1}$ of the plastic workpiece. For example, it may be the springback amount ($\theta_{n+1}-\theta_0$) being the difference between the angle $\theta_0$, which is the initial value, in the designed shape and the angle $\theta_{n+1}$ of the shape after springback. In such case, the tolerance is decided according to the value corresponding to the springback amount. Namely, it is the value showing the range near 0.

The case where the die assembly shape is designed using the coordinate value of nodes set on the plastic workpiece as a parameter with reference to FIG. 4. Shapes shown in this figure are, as similar to the above described FIG. 3, designed shape $A_0$, shape after springback $A_1$, springback-considered shape $A_{exp\_1}$, each. In individual shapes, nodes of the FEM model are set. Individual coordinate values (X, Y, Z) of identical nodes ($N_1, N_2, N_3, \ldots$) of this FEM model are expressed as follows, respectively.

Designed shape $A_0$: Ni (Xa, Ya, Za)

Shape after springback $A_1$: Ni (Xb, Yb, Zb)

Springback-considered shape $A_{exp\_1}$: Ni (Xc, Yc, Zc)

Where, i takes all integers from i=1 to i=maximum node number.

The shape comparing function as described above calculates a distance between each node, i.e., the springback amount. Then these distance values are checked whether these values over the predetermined tolerance Espb or not. And, in the case where $$Espb > |Ni(Xb, Yb, Zb) - Ni(Xa, Ya, Za)| \quad (2)$$

the formula (2) is satisfied in all nodes, i.e., if the springback amount is smaller than the tolerance Espb, the dimensional accuracy of the plastic workpiece falls in the range of the predetermined dimensional tolerance and hence, the die assembly is manufactured according to such shape.

On the other hand, in the case where the above described formula (2) is not satisfied, the coordinate of each node for the springback-considered shape is calculated by the following formula (3).

$$Ni(Xc, Yc, Zc = Ni(Xa, Ya, Za) - [Ni(Xb, Yb, Zb) - Ni(Xa, Ya, Za)] \quad (3)$$

Each node, which is expressed by the above described formula (3,) in the springback-considered shape is located in the position calculated by subtracting the springback amount from the designed shape in the direction opposite to the springback direction. In other words, the point calculated by moving the predetermined node of the shape after springback around corresponding nodes in the designed shape as a center of puncture symmetry is the node of the springback-considered shape.

Then, the die assembly shape is calculated based on the springback-considered shape. The shape of the plastic workpiece to be manufactured with such die assembly is compared with the initial designed shape of the plastic workpiece. Repeated processing as described above allows the springback amount to reduce and the dimensional accuracy of the shape of the plastic workpiece actually processed.

The redesigning process with respect to the angle as described above and the redesigning process with respect to the coordinates of each node may be performed at the same time. Specifically, a predetermined part (element) in FEM data may be subjected to calculation for a springback-considered shape based on the coordinates of each node while other parts may be subjected to calculation for a springback-considered shape based on the angles.

On the other hand, according to one-time correction process (workpiece-redesigning function), the process may be limited to either the process utilizing the angle or the process utilizing the coordinates of each node. These processes can be performed alternately. In this case, not only the node positions of the angle-corrected part but also the shapes of the other parts may be corrected as well by the angle correction alone. Therefore, speed of the process can be enhanced.

The part (element) subjected to correction with respect to the angle and the part (element) subjected to correction with respect to the node coordinates may be predetermined so that each correction can be performed at these predetermined parts. Thus, the process for correcting the designed shape is executed based on the suitable parameters that have effect on the springback, thereby rendering the process to be faster.

The above described each function of the CPU 11 of the computer 1 can be realized through executing the above described computer program product for each function by the CPU 11. This computer program product is stored in a removable medium such as the CD-ROM and a non-removable medium such as the hard disk. The computer program product is read from the medium or downloaded from other computer on a network to incorporate in the computer 1.

The computer program product for simulation controls an operation of the computer 1 so that the computer 1 performs the processes of: calculating an initial die assembly shape for the plastic workpiece according to a predetermined designed shape of said plastic workpiece; calculating a shape of the plastic workpiece to be manufactured with the initial die assembly shape considering a manufacturing condition of the plastic workpiece; comparing the calculated shape of the plastic workpiece with the designed shape of the plastic workpiece; calculating a new redesigned shape of the plastic workpiece on the basis of a result of the comparison; and calculating a new die assembly shape according to the redesigned shape of the plastic workpiece.

<Operation>

The operation of the present embodiment will be described below with reference to FIG. 5 and FIG. 6. FIG. 5 is a flow chart showing a total operation of the first embodiment of the present invention. FIG. 6 is the flow chart showing the operation in the case of designing the die assembly using a bending angle as a parameter in above described bending working.

First of all, the computer 1 read out the data (for example, CAD data) of the previously designed shape of the plastic workpiece as the commercial product from the built in hard disk 12 or other computer (not illustrated) connected to the computer 1 via the network. Here, for example, when the data read out from the hard disk 12 is CAD data, the CAD data is converted to mesh data for analyzing. The die assembly shape is calculated according to such designed shape (step S1, initial die assembly initial calculating step.) Next, the shape of the plastic workpiece manufactured by press working using such die assembly is calculated by simulation with the FEM model (step S2, workpiece shape calculating step.) In this step, the springback characteristic of the material used for the plastic workpiece is also considered. Namely, such characteristic has been previously stored in the computer 1 and such data is read out and referred in the workpiece shape calculating step. Therefore, the calculated shape of the plastic workpiece is calculated considering the deformation caused by springback. However, deformation occurred on the plastic workpiece is not restricted to that caused by springback, for example, deformation may occur caused by a kind of material or a shape of the plastic workpiece.

Subsequently, the calculated shape of the plastic workpiece is compared with the designed shape (step S3, shape comparing step.) For example, the difference of the bending angles between the predetermined position of the shape after springback and the corresponding position of the designed shape is calculated as the springback amount. Then it is decided whether the springback amount falls in the allowable range. Or, as described above, the decision may be made about whether the distance falls in the allowable range between nodes in the shape after springback and the designed shape. If the springback amount of the each position of the plastic workpiece falls in the range of tolerance, no correction is needed for the die assembly and thus, the die assembly is manufactured according to such designed shape of die assembly (step S5). On the other hand, if the springback amount does not fall within the range of the tolerance, fault of dimensional accuracy of the plastic workpiece is excessive and therefore, correction of the die assembly shape is required. Then, the springback considerd shape is calculated by the above described approach (step S6, the workpiece redesigning step). The die assembly shape according to this springback-considered shape is calculated (step S7, die assembly reshapeing step).

Following this step, the shape of the plastic workpiece to be manufactured using this die assembly is calculated by simulation (step S2) and the above described processing is repeatedly operated.

However, the processing steps in the present system are not restricted to the steps as described. For example, in the case where comparing of shape is carried out in a predetermined 1 node of the plastic workpiece and the springback considered shape is calculated in the node, simulation may be again operated immediately after the step. Namely, it is possible to return to the step 2 immediately after changing the coordinates of a specific 1 node or changing the bending angle of a specific position in the step 6 of FIG. 5. When all nodes fall in the dimensional tolerance, the new die assembly shape may be calculated. As described above, by correcting only necessary position which have to consider the springback, it has a possibility to calculate an optimal springback considered shape. Therefore, it is possible to achieve quick die assembly shape calculation.

Meanwhile, with reference to FIG. 6, the operation, which is the example of processes executed in the above described steps S3, S4, and S6, when the angle in bending processing is defined as the parameter will be described below. Hereby, the case, where only the angle of the specific 1 position is the parameter, will be described.

First, in the step S2 shown in FIG. 5, the FEM model of the plastic workpiece is prepared by simulation. This data of simulation is subjected to processing. For this step, it is defied as n=0 (step S11).

Next, a first springback amount is calculated. Then, a decision is made about whether this value of the dimensional error caused by springback falls in the range of the tolerance Espb (step S12). Finally, if the value falls in the range, the processing shown in FIG. 6 is finished to move to actual die assembly manufacturing step shown in the step S5 of FIG. 5.

Figure 15:
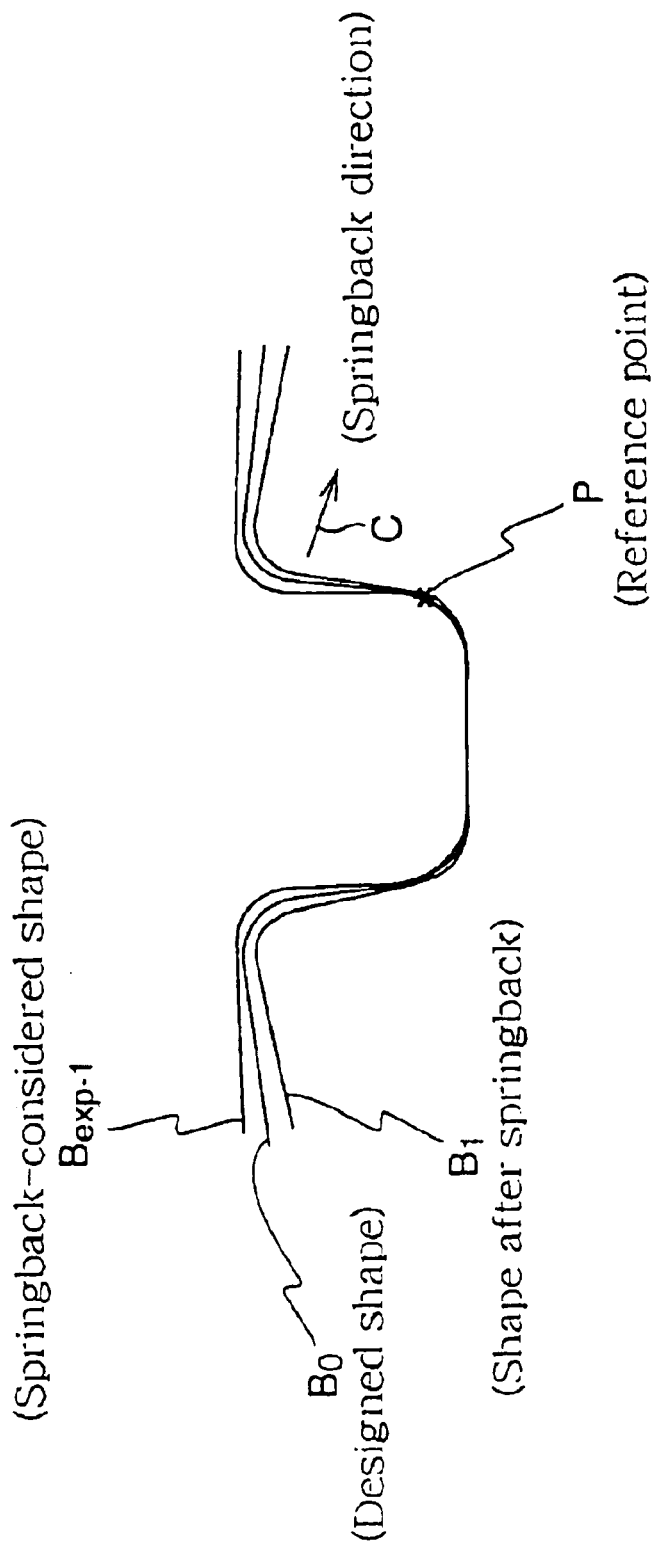
FIG. 15 is a sectional schematic view showing an example of the plastic workpiece.

In the case where the springback amount does not fall in the range of the tolerance in the step S12, the bending angle is calculated by the above described formula (1) considering the springback (step S13). The FEM model is generated again applying this bending angle (step S14, step S6 of FIG. 5) in order to perform the simulation again (step S16). It should be noted, FIG. 15 shows an example of executing a simulation again after correcting a data of die assembly shape based on the new designed shape of the plastic workpiece. But as shown in FIG. 6, it is possible to calculate the shape of the plastic workpiece after springback using a model of redesigned workpiece shape.

Following this step, n=n+1 is defined to check the dimensional error of the new designed shape (returning to the step S12). Through these steps, until the springback amount falls in the tolerance of the first designed dimension of the plastic workpiece, the springback-considered shape is repeatedly calculated. Therefore, it is possible to calculate die assembly shape by simulation automatically for manufacturing the plastic workpiece having high dimensional accuracy. Accordingly, it is possible to reduce the die assembly manuacturing cost and shorten a term for development of the workpiece.

Figure 7A:
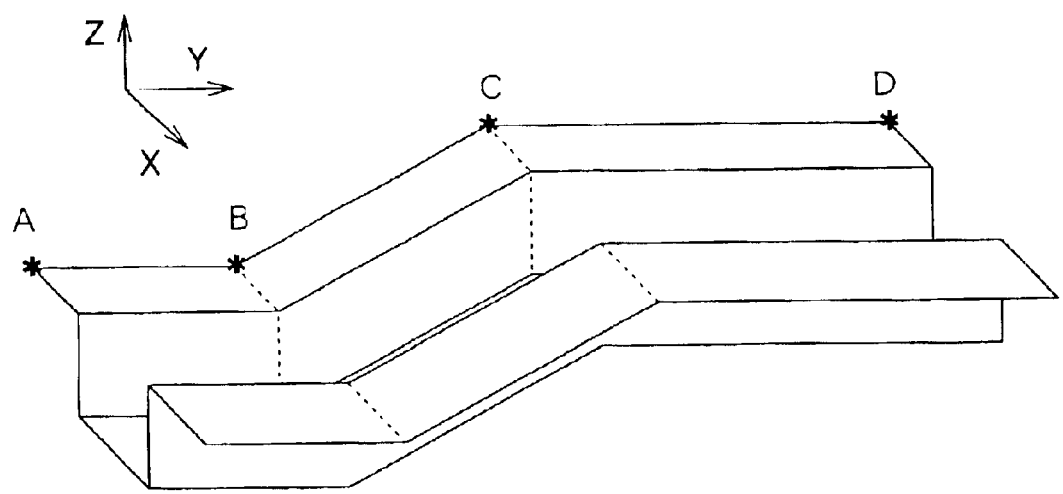
FIG. 7A shows a perspective view thereof and FIG. 7B shows a sectional view.
Figure 7B:
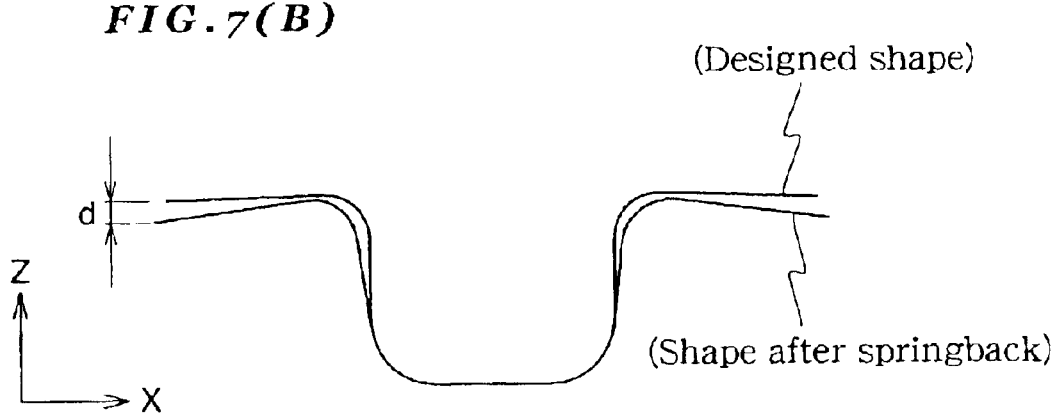
Figure 8:
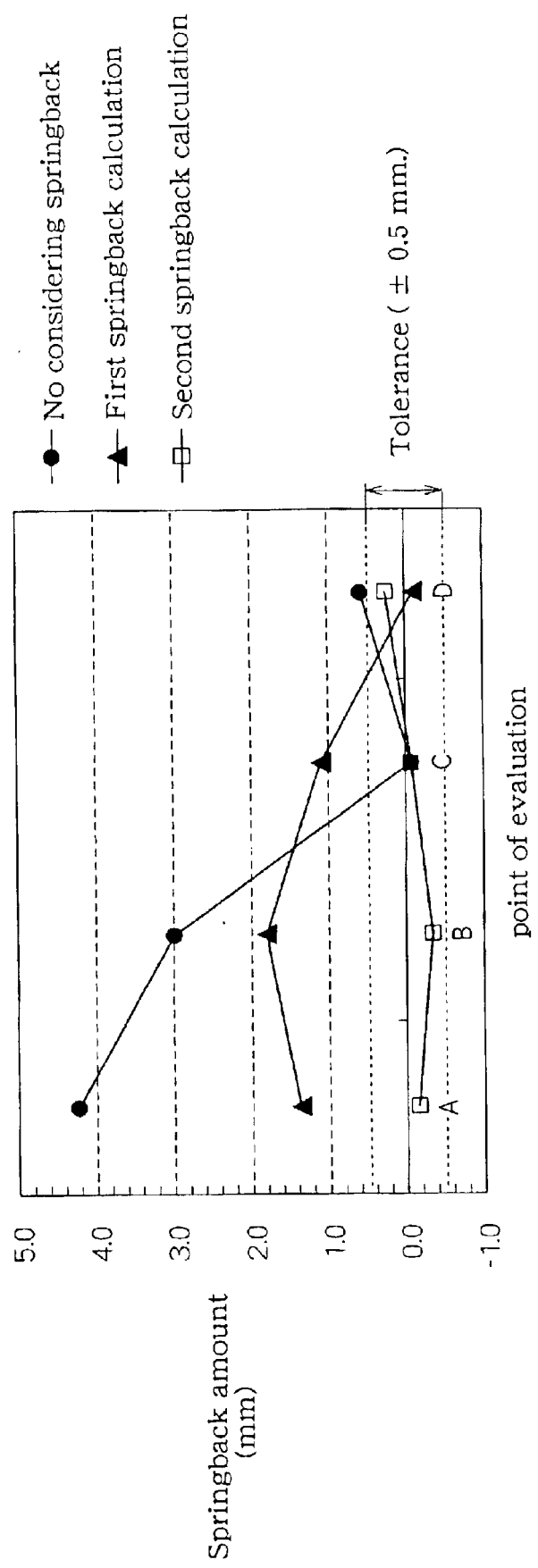
FIG. 8 shows a springback amount in a predetermined position of the plastic workpiece shown in FIG. 7.

Next, the dimensional accuracy of plastic workpiece formed by the die assembly specifically designed by above mentioned designing process will be described with reference to FIG. 7 and FIG. 8. FIG. 7 is a figure showing the shape of the plastic workpiece used in this example. Here, FIG. 7A shows a perspective view thereof and FIG. 7B shows a sectional view. FIG. 8 is a graph expressing the springback amount in the predetermined position of the plastic workpiece shown in FIG. 7.

The plastic workpiece shown in FIG. 7A having a hat shape of the sectional view in X direction (refer to FIG. 7B.) In this figure, points A, B, C, and D are set in one lateral side. When the plastic workpiece is manufactured by press working of a platy blank member, as described above, both ends shown in FIG. 7B becomes a state where the ends have been bent by springback in a minus direction in a Z axis. The dimensional error in the Z direction in both ends, i.e., the difference from the designed shape in the Z direction, is defined as the springback amount in this embodiment (refer to a reference numeral d of FIG. 7B.) For this springback amount, the shape of the plastic workpiece and the die assembly shape are recalculated as described above.

The springback amount in this step is shown in FIG. 8. In the FIG. 8, an axis of abscissa indicates each point (A, B, C, and D) of the plastic workpiece and axis of ordinates indicates the springback amount (mm), respectively. A circular symbol plotted in the FIG. 8 shows a case of no springback considering, namely, the springback amount of the plastic workpiece simulated based on the initially designed die assembly shape. A triangular symbol plotted shows the springback amount of the plastic workpiece simulated based on the die assembly shape using the springback considered shape once calculated. A square symbol plotted shows the springback amount of the plastic workpiece simulated based on the die assembly shape using the springback considered shape twice calculated. In this case, tolerance of the springback amount is assumed to ±0.5 mm.

With reference to the data, the springback amount after one time calculation of springback considered shape does not fall in the range of the dimensional tolerance.

The springback amount after two times calculation of estimation of springback considered shape falls in the range of the dimensional tolerance. In addition, by repeating the calculation of the springback considered shape, the springback amount close to zero. Thus, it is possible to calculate the optimal springback considered shape.

<Second Embodiment>

Figure 10A:
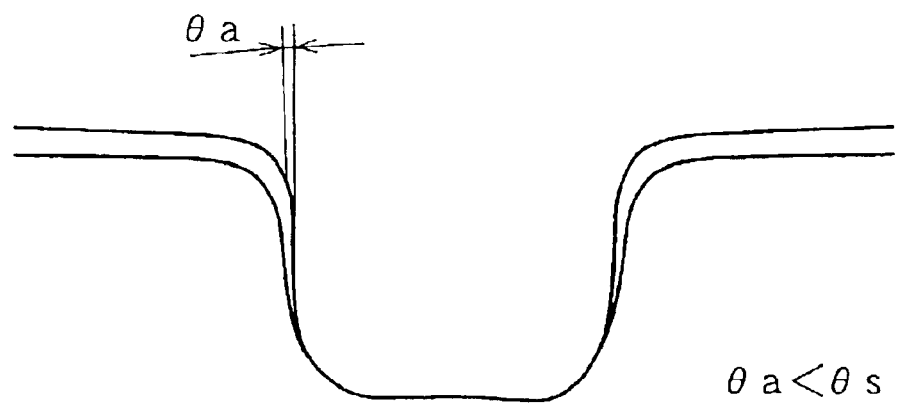
FIGS. 10A and 10B are diagrams showing an example of judging whether or not the draft is within an allowable range according to the second embodiment of the invention.
Figure 10B:
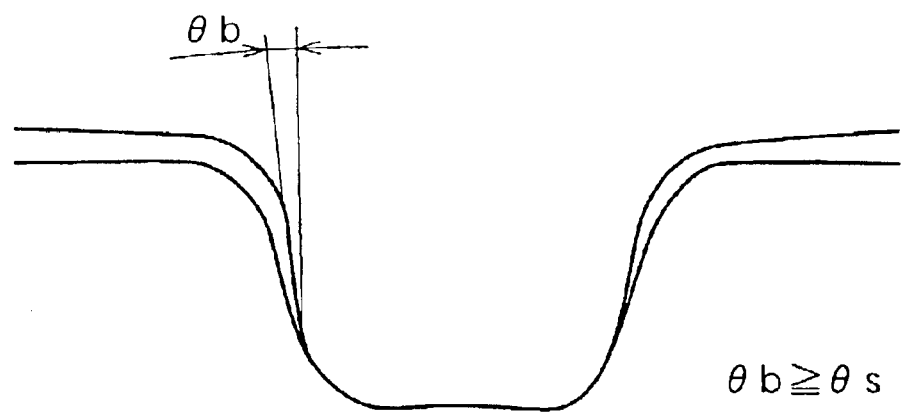
Figure 11:
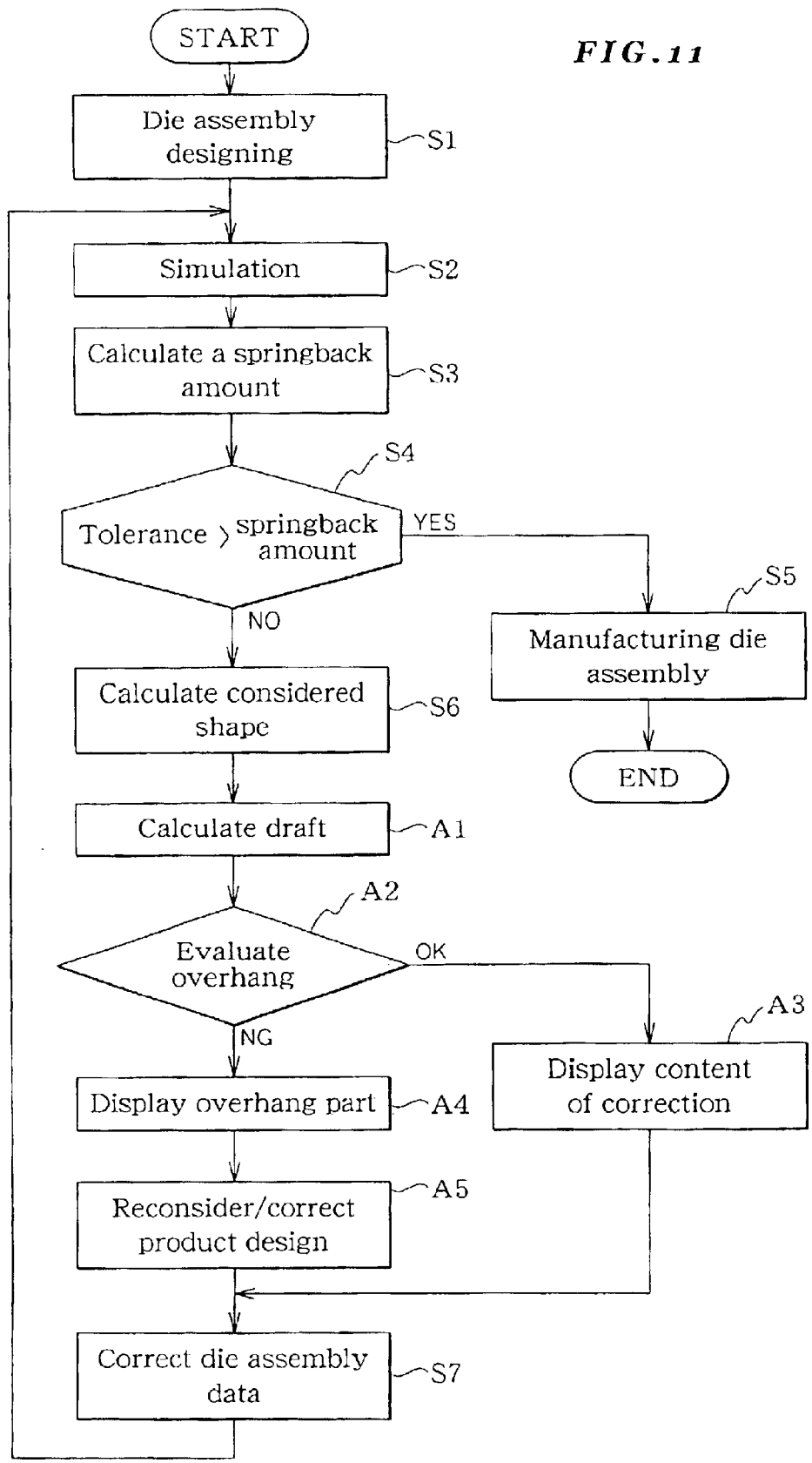
FIG. 11 is a flow chart showing an operation of the second emboduiment
Figure 14:
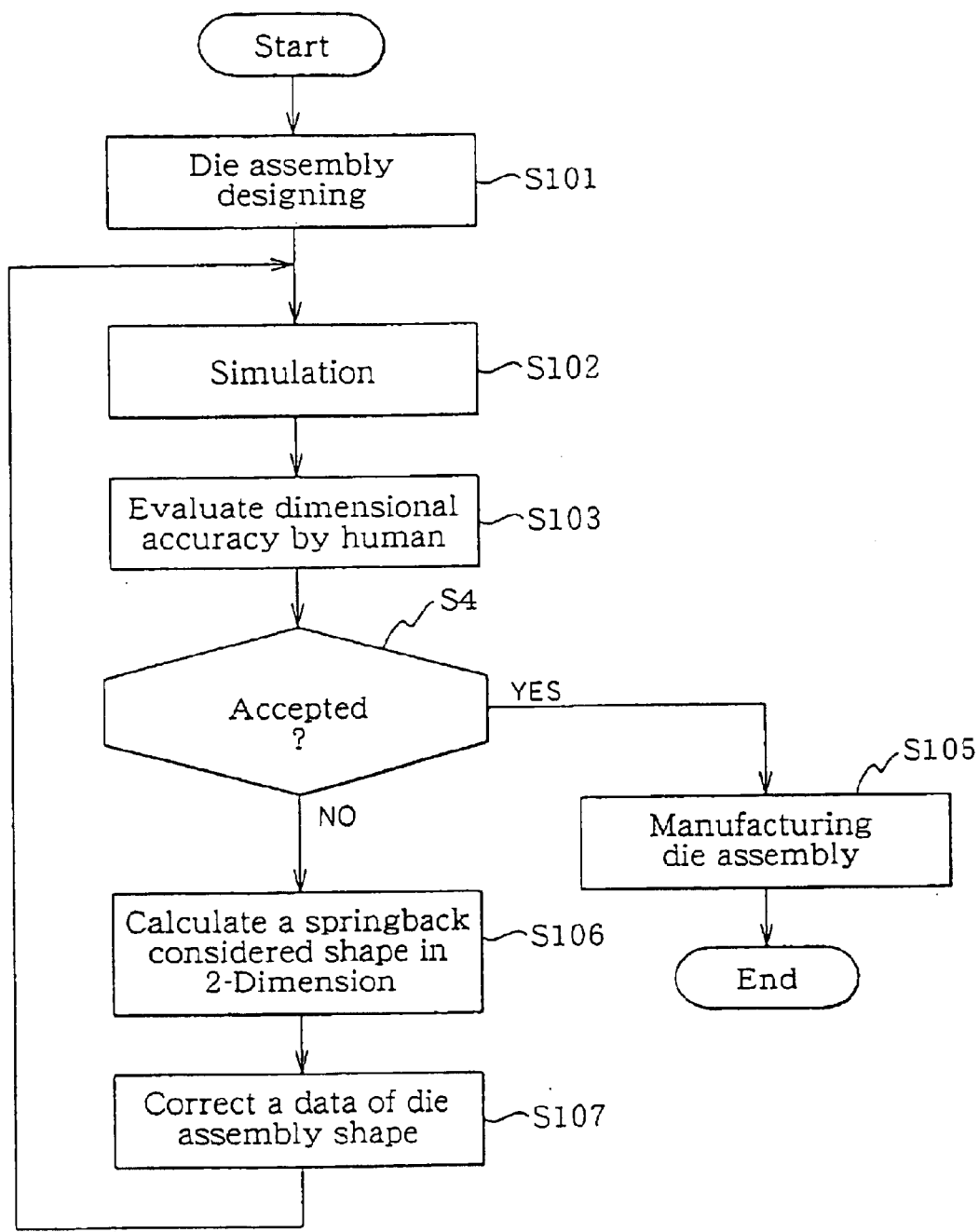
FIG. 14 is a flow chart showing steps of simulation of conventional die assembly shape calculation.

Hereinafter, a second embodiment of the present invention will be described with reference to FIGS. 9 to 11. FIGS. 9 and 10 are diagrams for illustrating a method for evaluating whether or not the corrected designed shape of the plastic workpiece is producible. FIG. 11 is a flow chart showing processes according to the second embodiment of the present invention.

This embodiment relates to a process for minimizing the occurrence of deficiency of the plastic workpiece being unproducible due to the designed shape of the plastic workpiece, i.e., the die assembly, calculated according to Embodiment 1 described above. Specifically, Embodiment 2 aims at controlling the situation where an optimal die assembly corresponding to the original shape of the product can be designed by simulation but is unproducible in practice. An unproducible designed shape of the plastic workpiece refers to, for example, overhang (also referred to as undercut) where there is no draft in the die assembly. This case is exemplified in the following description.

<Configuration>

According to the present embodiment, the computer that comprises the functions described in Embodiment 1 further comprises a producibility judging function to judge the presence of deficiency upon producing the plastic workpiece based on the new designed shape of the plastic workpiece calculated by the workpiece-redesigning function, and a producibility notifying function to notify the operator of the computer of the judgment result from the producibility judging function. Specifically, the producibility judging function comprises a draft calculating function to calculate a draft of a predetermined part of the new designed shape of the plastic workpiece calculated by the workpiece-redesigning function, and a draft comparing function to judge the producibility of the plastic workpiece by comparing the value of the calculated draft and the value of the predetermined allowable draft.

The draft calculating function as a part of the producibility judging function primarily calculates the draft of the part subjected to bending processing. Herein, the term "draft" refers to an amount of slope considered to provide easy release of the workpiece from the die assembly (see Glossary of Technical Terms in Japanese Industrial Standards). For example, a draft may refer to a tilt angle of the die assembly with respect to the pressing direction. Insufficient draft may cause deficiency such as parting the workpiece from the die assembly being impossible or cracks being caused. Therefore, the draft has to be kept at a value higher than a predetermined value.

The draft comparing function as a part of the producibility judging function compares the calculated draft with the minimum allowable draft pre-stored in the computer for judgment. For example, when the draft calculated by the draft comparing function is smaller than the allowable draft, the draft comparing function judges that the workpiece is unproducible. The judgment by the producibility judging function is not necessarily based on the draft. The judgment may be performed based on other factor of the new designed shape.

The producibility notifying function displays the judgment result from the above-described producibility judging function as a graphic display or data of a FEM model on a computer display. When the judgment is performed based on the draft, the notice may be displayed only when the calculated draft is smaller than the allowable draft as judged by the draft comparing function to notify the operator that the workpiece is unproducible (draft propriety notifying function). At this point, in addition to the notice, the shape of the product is also displayed so as to indicate the part of deficiency such as overhang (undercut) that is causing the workpiece unproducible. By doing so, the operator will be aware of the deficiency (e.g., overhang) at the designing stage of the die assembly and may take suitable measure such as terminating the present process to change the shape of the workpiece. As a result, cost for correcting the die assembly can be reduced and time for designing the die assembly can be shortened.

Furthermore, the computer may comprise an optimization process terminating function to terminate execution of the process of optimizing the die assembly shape when the workpiece is judged unproducible by the producibility judging function. The optimization process terminating function waits for the operator to instruct termination of the process and to instruct the subsequent process. Specifically, the computer enters a wait state and waits for instruction for terminating the present process, or enters an input wait state to wait for input of data of a redesigned shape. Accordingly, the process for correcting the die assembly based on the designed shape that may be unproducible is no longer continued and automatically terminated, thereby minimizing useless process.

The producibility notifying function is not essential and the operator may not be notified of the judgement of producibility. In this case, the operator can spontaneously extract the result of judgment from the computer and may change the designed shape or terminate the process as described above. Thus, a die assembly can be designed speedily and at low cost.

Figure 9A:
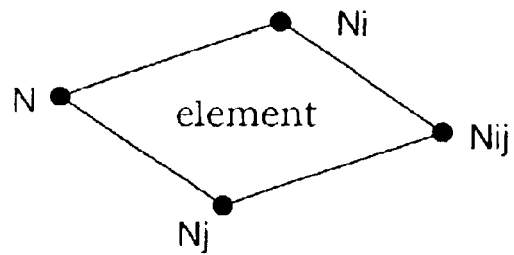
FIGS. 9A to 9D are diagrams for illustrating the procedure of calculating a draft according to a second embodiment of the invention.
Figure 9B:
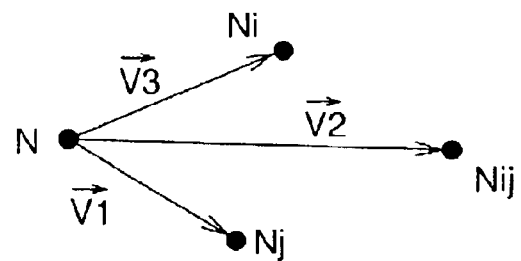
Figure 9C:
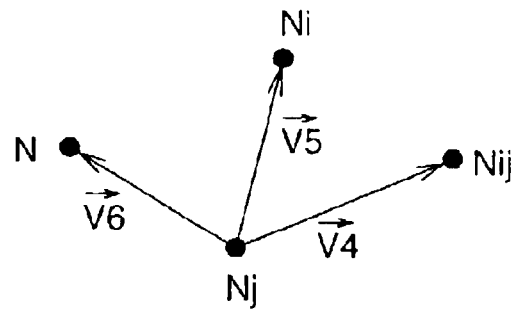
Figure 9D:
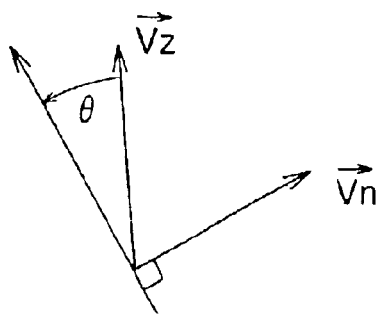

FIGS. 9A to 9D are diagrams showing an exemplary calculation for a draft. An element expressed by FEM data at a part for calculating the draft of the plastic workpiece is considered. In order to determine the normal vector of the element consisting of four points ($N$, $N_i$, $N_j$, $N_{ij}$) shown in FIG. 9A, first, vectors V1, V2, V3, V4, V5 and V6 shown in FIGS. 9B and 9C are expressed as the following Expressions 1 to 6, respectively.

$$+i\vec{V1} = Ni - N \quad (1)$$

$$+i\vec{V2} = Nij - N \quad (2)$$

$$+i\vec{V3} = Ni - N \quad (3)$$

$$+i\vec{V4} = Nij - Nj \quad (4)$$

$$+i\vec{V5} = Ni - Nj \quad (5)$$

$$+i\vec{V6} = N - Nj \quad (6)$$

Then, the normal vectors of the element are determined as the following Expressions 7 to 10 based on the above-mentioned vectors.

$$+i\vec{VN1} = Dir \times (+i\vec{V1} \times +i\vec{V2}) \quad (7)$$

$$+i\vec{VN2} = Dir \times (+i\vec{V2} \times +i\vec{V3}) \quad (8)$$

$$+i\vec{VN3} = Dir \times (+i\vec{V4} \times +i\vec{V5}) \quad (9)$$

$$+i\vec{VN4} = Dir \times (+i\vec{V5} \times +i\vec{V6}) \quad (10)$$

where "Dir" is a flag indicating directions in both sides of the element (1.0 or −1.0). Symbol "X" between the vectors refers to cross product of the vectors.

Then, the draft is calculated based on the above-described normal vectors. The average of the four normal vectors is calculated. Alternatively, a vector with the center value is selected and its unit vector $V_n$ is calculated to be used as the normal vector of the element. Since the four normal vectors refer to a single element, the values thereof are generally the same. Thus, only one of the four normal vectors (e.g., Vector VN2) maybe calculated to be used as a normal vector of the element. Then, the draft at the part of element is expressed by the following Expression 11 based on the predetermined unit vector $V_z$ extending in the pressing direction and the unit vector $V_n$ of the normal vector.

$$\theta = 0.5\pi - A\cos(\pm \vec{V}_z \cdot \pm \vec{V}_n) \tag{11}$$

where the symbol "·" between the vectors refers to dot product of the vectors. Thus, the draft is calculated (producibility judging function, draft calculating function).

When the calculated draft θ is smaller than the predetermined allowable draft θs, the producibility judging function (draft comparing function) judges that the plastic workpiece is unproducible in practice. According to an example shown in FIG. 10A, the calculated draft θa is smaller than the allowable draft, thus the workpiece is judged inappropriate, i.e., unproducible. In FIG. 10B, the calculated draft θb is greater than the allowable draft, and thus the designing process is continued based on the same shape. The value of the allowable draft is predetermined, for example, as 0.3 degree or −10 degree, differing depending on the shape at the part of the element to be determined.

Each of the above-described processes are automatically executed by integrating, into the CPU of the computer, a program written for executing the processes stored in the computer or a program provided from other storage medium.

<Operation>

Hereinafter, the operation according to the present embodiment will be described with reference to FIG. 11. The operation by the functions according to the present embodiment includes, between the workpiece-redesigning step (Step S6 in FIG. 5) and the die assembly reshaping step (Step S7 in FIG. 5) according to Embodiment 1, a producibility judging step to judge whether or not a deficiency exists upon producing the plastic workpiece based on the new designed shape of the plastic workpiece calculated by the workpiece-redesigning step (draft calculating step and draft comparing step), and a producibility notifying step. Thus, descriptions of the steps shown in FIG. 5 are omitted.

As shown in FIG. 11, following the processes for simulation, evaluation of dimensional accuracy and calculation of the springback-considered shape (Steps S1 to S6), a draft at a part corrected by the springback-considered shape calculating process (workpiece-redesigning step) is calculated (Step A1, draft calculating step). Then, the presence of overhang is evaluated (Step A2, draft comparing step). If no problem is found by the evaluation, the content of the correction of the new designed shape calculated by the workpiece-redesigning step (springback-considered shape calculating process) is displayed on a computer display or the like (Step A3), and the die assembly is designed and recorrected based on that new designed shape (Step S7).

When a deficiency is found by overhang evaluation and the workpiece is unproducible, the part in problem is output to the operator, for example, by being displayed on a computer display (Step A4, producibility notifying step). The notified operator can reconsider or try to correct the shape of the product (Step A5). Alternatively, if rapid correction is impossible, the operator can terminate the process (Optimization process terminating step).

A die assembly may have a shape which is unproducible in practice due to overhang (undercut) even though its dimensional accuracy has been improved considering deformation such as springback. According to this embodiment, the operator is notified of this at an early stage of die assembly designing. Therefore, the operator can take an appropriate measure beforehand such as changing the basic designed shape of the workpiece, thereby improving the speed of the process for optimizing the die assembly at low cost.

The present invention is constituted as described above and works. According to this, it is possible to simulate the die assembly shape automatically for preventing the fault of the dimensional accuracy of the plastic workpiece manufactured by press working and the like. Therefore, a correction cost of the die assembly shape can be reduced and optimization of the die assembly shape can be aided, and furthermore, it is possible to shorten development term of the workpiece by reducing the steps of the die assembly shape calculation. These effects are excellent not realized in the conventional inventionones.

Particularly, materials such as high tensile strength steel and aluminium, which are conventionally difficult to apply for plastic workpiece due to fault of dimensional accuracy caused by springback can be freely applied to a commercial product. Using such materials for a predetermined product such as an automobile component can realize a light weight of such product as the body of the automobile.

Moreover, since the dimensional accuracy of components is stabilized, a dimensional accuracy of welding in welding step is improved, accordingly, it is possible to improve a quality of assembly as product using the component. Moreover, a stable quality can be maintained for mass production.

In addition, a press component conventionally manufactured by drawing press due to fault of dimensional accuracy can be manufactured by press working not applying draw. Thus, yield of the material is greatly improved and the material cost can be reduced A process for judging whether or not a deficiency such as overhang that renders the plastic workpiece unproducible is included in the process for optimizing the die assembly shape so that the deficiency can be found at a simulation stage and thus the problem can be solved rapidly. Therefore, the need of redesigning the workpiece after forming the die assembly can be minimized, cost for correcting the die assembly can be reduced and time for designing the die assembly can be shortened.

Furthermore, by providing a function to automatically notify the operator of the computer of whether or not the plastic workpiece is producible, the deficiency is immediately notified to the operator, who can thereafter take an appropriate measure such as manually terminating the die assembly correcting process, or changing the designed shape of the notified part. Thus, increase in the die assembly production cost or delay in production for being late to deal with the problem can be minimized.

What is claimed is:

1. A system for aiding optimization of a die assembly shape to manufacture a predetermined plastic workpiece using a computer, said computer comprising:

an initial die assembly shape calculating function to calculate a die assembly shape for the plastic workpiece according to a predetermined designed shape of said plastic workpiece;

a workpiece shape calculating function to calculate the shape of the plastic workpiece to be manufactured with the initial die assembly shape considering a manufacturing condition of the plastic workpiece;

a shape comparing function to compare the calculated shape of the plastic workpiece and the designed shape of the plastic workpiece;

a workpiece-redesigning function to calculate a new designed shape of the plastic workpiece according to a result of the comparison; and a die assembly reshaping function to calculate a new die assembly shape according to the new designed shape of the plastic workpiece.

2. The system for aiding optimization of the die assembly shape for plasticity manufacturing according to claim 1, wherein said workpiece shape calculating function works for the new die assembly shape calculated by said die assembly reshaping function.

3. The system for aiding optimization of the die assembly shape for plasticity manufacturing according to claim 1, wherein said shape comparing function calculates a predetermined comparison value by comparing the predetermined designed shape of said plastic workpiece with the shape calculated by said workpiece shape calculating function, and said workpiece-redesigning function and said die assembly reshaping function work when said calculated comparison value does not fall in a predetermined tolerance range in order to calculate the new die assembly shape.

4. The system for aiding optimization of the die assembly shape for plasticity manufacturing according to claim 1, wherein said workpiece shape calculating function calculates the shape of the plastic workpiece considering a springback characteristic of a predetermined material used for said plastic workpiece.

5. The system for aiding optimization of the die assembly shape for plasticity manufacturing according to claim 4, wherein said shape comparing function calculates an amount of springback, which is a difference between the calculated shape of said plastic workpiece and the predetermined designed shape for each predetermined position of the plastic workpiece, and said workpiece-redesigning function calculates the new designed shape of the plastic workpiece by subtracting said springback amount from the designed shape of the plastic workpiece in an opposite direction of a springback direction of the plastic workpiece in each position of said plastic workpiece.

6. The system for aiding optimization of the die assembly shape for plasticity manufacturing according to claim 1, wherein said shape comparing function compares angles in predetermined positions of said plastic workpiece.

7. The system for aiding optimization of the die assembly shape for plasticity manufacturing according to claim 1, wherein said shape comparing function compares 3-dimensional positions of predetermined nodes set on said plastic workpiece.

8. The system for aiding optimization of a die assembly shape for plasticity manufacturing according to claim 1, the computer further comprising a producibility judging function to judge the presence of deficiency upon producing the plastic workpiece based on the new designed shape of the plastic workpiece calculated by the workpiece-redesigning function.

9. The system for aiding optimization of a die assembly shape for plasticity manufacturing according to claim 8, wherein the producibility judging function comprises a draft calculating function to calculate a draft of the new designed shape of the plastic workpiece calculated by the workpiece-redesigning function, and a draft comparing function to judge the producibility of the plastic workpiece by comparing the value of the calculated draft and the value of the predetermined allowable draft.

10. The system for aiding optimization of a die assembly shape for plasticity manufacturing according to claim 8, the computer further comprising a producibility notifying function to notify the operator of the computer of the judgment result from the producibility judging function.

11. The system for aiding optimization of a die assembly shape for plasticity manufacturing according to claim 9, the computer further comprising a draft propriety notifying function which operates when the draft calculated by the draft comparing function is smaller than the allowable draft and notifies the operator of that result.

12. The system for aiding optimization of a die assembly shape for plasticity manufacturing according to claim 8, the computer further comprising an optimization process terminating function to terminate execution of the process for optimizing the die assembly shape when the producibility judging function judges that the plastic workpiece is unproducible.

13. A method for aiding optimization of a die assembly shape to manufacture a predetermined plastic workpiece by using a computer, the method comprising:

calculating an initial die assembly shape for the plastic workpiece according to a predetermined designed shape of said plastic workpiece;

calculating a shape of the plastic workpiece to be manufactured with the initial die assembly shape considering a manufacturing condition of the plastic workpiece;

comparing the calculated shape of the plastic workpiece with the designed shape of the plastic workpiece;

calculating a new redesigned shape of the plastic workpiece on the basis of a result of the comparison; and calculating a new die assembly shape according to the redesigned shape of the plastic workpiece.

14. The method for aiding optimization of a die assembly shape for plasticity manufacturing according to claim 13, further comprising, between redesigning the plastic workpiece and reshaping the die assembly, judging the presence of a deficiency upon producing the plastic workpiece based on the new designed shape of the plastic workpiece calculated in the redesigning the plastic workpiece.

15. A computer program product stored in a storage medium for aiding optimization of a die assembly shape to manufacture a predetermined plastic workpiece by controlling an operation of a computer, the program product:

calculating an initial die assembly shape for the plastic workpiece according to a predetermined designed shape of said plastic workpiece;

calculating a shape of the plastic workpiece to be manufactured with the initial die assembly shape considering a manufacturing condition of the plastic workpiece;

comparing the calculated shape of the plastic workpiece with the designed shape of the plastic workpiece;

calculating a new redesigned shape of the plastic workpiece based on a result of the comparison; and calculating a new die assembly shape according to the redesigned shape of the plastic workpiece.

16. A computer program product for aiding optimization of the die assembly shape for plasticity manufacturing according to claim 15, wherein the program product controls the computer to execute a process of judging the presence of a deficiency upon producing the plastic workpiece based on the new designed shape of the plastic workpiece calculated in the redesigning the plastic workpiece.

17. A system that optimizes a die assembly shape to manufacture a predetermined plastic workpiece, comprising:

- an initial die assembly shape calculator that calculates an initial die assembly shape for the plastic workpiece according to a predetermined designed shape of said plastic workpiece;
- a workpiece shape calculator that calculates a manufacturing shape of the plastic workpiece to be manufactured with the initial die assembly shape, considering a manufacturing condition of the plastic workpiece;
- a shape comparator that compares the calculated manufacturing shape of the plastic workpiece and the predetermined designed shape of the plastic workpiece;
- a workpiece-redesigner that calculates a new designed shape of the plastic workpiece according to a result of the comparison; and
- a die assembly reshaper that calculates a new die assembly shape according to the new designed shape of the plastic workpiece.

* * * * *